US010853249B2

(12) United States Patent
Gschwind et al.

(10) Patent No.: US 10,853,249 B2
(45) Date of Patent: *Dec. 1, 2020

(54) READ AND WRITE SETS FOR TRANSACTIONS OF A MULTITHREADED COMPUTING ENVIRONMENT

(71) Applicant: INTERNATIONAL BUSINESS MACHINES CORPORATION, Armonk, NY (US)

(72) Inventors: Michael K. Gschwind, Chappaqua, NY (US); Valentina Salapura, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 34 days.

This patent is subject to a terminal disclaimer.

(21) Appl. No.: 16/026,207

(22) Filed: Jul. 3, 2018

(65) Prior Publication Data

US 2018/0314637 A1 Nov. 1, 2018

Related U.S. Application Data

(63) Continuation of application No. 15/145,163, filed on May 3, 2016, now Pat. No. 10,042,761.

(51) Int. Cl.
*G06F 12/00* (2006.01)
*G06F 13/00* (2006.01)
(Continued)

(52) U.S. Cl.
CPC ...... *G06F 12/0804* (2013.01); *G06F 12/0815* (2013.01); *G06F 12/0828* (2013.01); *G06F 12/0831* (2013.01); *G06F 2212/621* (2013.01)

(58) Field of Classification Search
CPC ............. G06F 12/0804; G06F 12/0815; G06F 12/0828; G06F 12/0831; G06F 2212/621
(Continued)

(56) References Cited

U.S. PATENT DOCUMENTS 5,428,761 A * 6/1995 Herlihy ............... G06F 12/0831
711/130
6,119,205 A * 9/2000 Wicki ................. G06F 12/0804
711/122

(Continued)

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.

(Continued)

*Primary Examiner* — Sheng Jen Tsai
(74) *Attorney, Agent, or Firm* — Blanche E. Schiller, Esq.; Steven Chiu, Esq.; Heslin Rothenberg Farley & Mesiti P.C.

(57) ABSTRACT

Facilitating processing in a computing environment. A request to access a cache of the computing environment is obtained from a transaction executing on a processor of the computing environment. Based on obtaining the request, a determination is made as to whether a tracking set to be used to track cache accesses is to be updated. The tracking set includes a read set to track read accesses of at least a selected portion of the cache and a write set to track write accesses of at least the selected portion of the cache. The tracking set is assigned to the transaction, and another transaction to access the cache has another tracking set assigned thereto. The tracking set assigned to the transaction is updated based on the determining indicating the tracking set is to be updated.

20 Claims, 16 Drawing Sheets

(51) Int. Cl.
*G06F 12/0804* (2016.01)
*G06F 12/0815* (2016.01)
*G06F 12/0817* (2016.01)
*G06F 12/0831* (2016.01)

(58) Field of Classification Search
USPC .......................................................... 711/141
See application file for complete search history.

(56) References Cited

U.S. PATENT DOCUMENTS

| | | | | |
|---|---|---|---|---|
| 6,158,019 | A * | 12/2000 | Squibb | G06F 11/1469 |
| | | | | 714/13 |
| 6,185,019 | B1 | 2/2001 | Hobbs et al. | |
| 8,209,499 | B2 * | 6/2012 | Chou | G06F 9/467 |
| | | | | 711/150 |
| 8,298,488 | B1 | 10/2012 | Lewis et al. | |
| 8,949,510 | B2 * | 2/2015 | Chan | G06F 12/08 |
| | | | | 711/103 |
| 9,619,278 | B2 * | 4/2017 | Vermeulen | G06F 16/273 |
| 9,684,599 | B2 * | 6/2017 | Gschwind | G06F 9/3859 |
| 9,705,680 | B2 * | 7/2017 | Gschwind | G06F 9/466 |
| 9,727,470 | B1 * | 8/2017 | Cande | G06F 3/06 |
| 9,760,494 | B2 * | 9/2017 | Gschwind | G06F 12/0891 |
| 9,760,495 | B2 * | 9/2017 | Gschwind | G06F 12/0891 |
| 10,042,761 | B2 * | 8/2018 | Gschwind | G06F 12/0804 |
| 10,042,765 | B2 * | 8/2018 | Gschwind | G06F 12/0804 |
| 2005/0038964 | A1 * | 2/2005 | Hooper | G06F 12/0842 |
| | | | | 711/143 |
| 2007/0198781 | A1 * | 8/2007 | Dice | G06F 9/466 |
| | | | | 711/145 |
| 2008/0256074 | A1 * | 10/2008 | Lev | G06F 9/526 |
| 2009/0077329 | A1 * | 3/2009 | Wood | G06F 12/0815 |
| | | | | 711/156 |
| 2010/0332753 | A1 * | 12/2010 | Gray | G06F 1/3225 |
| | | | | 711/118 |
| 2011/0145516 | A1 * | 6/2011 | Adl-Tabatabai | G06F 8/458 |
| | | | | 711/152 |
| 2011/0153566 | A1 * | 6/2011 | Larson | G06F 9/466 |
| | | | | 707/638 |
| 2011/0154102 | A1 * | 6/2011 | Akutsu | G06F 11/2058 |
| | | | | 714/6.1 |
| 2011/0179230 | A1 | 7/2011 | Chou | |
| 2011/0307689 | A1 | 12/2011 | Chung | |
| 2012/0179875 | A1 | 7/2012 | Saha et al. | |
| 2012/0311273 | A1 | 12/2012 | Marathe et al. | |
| 2012/0324472 | A1 * | 12/2012 | Rossbach | G06F 9/467 |
| | | | | 718/106 |
| 2013/0290965 | A1 * | 10/2013 | Pohlack | G06F 9/466 |
| | | | | 718/101 |
| 2014/0122845 | A1 * | 5/2014 | Chung | G06F 9/528 |
| | | | | 712/228 |
| 2014/0379996 | A1 * | 12/2014 | Rajwar | G06F 9/3004 |
| | | | | 711/145 |
| 2015/0089159 | A1 * | 3/2015 | Busaba | G06F 12/0817 |
| | | | | 711/144 |
| 2015/0212818 | A1 * | 7/2015 | Gschwind | G06F 9/466 |
| | | | | 712/216 |
| 2015/0212852 | A1 * | 7/2015 | Gschwind | G06F 16/2308 |
| | | | | 707/703 |
| 2015/0212905 | A1 * | 7/2015 | Gschwind | G06F 11/1474 |
| | | | | 714/42 |
| 2015/0242218 | A1 * | 8/2015 | Shum | G06F 9/3865 |
| | | | | 712/216 |
| 2015/0331898 | A1 * | 11/2015 | Ou | G06F 16/2365 |
| | | | | 707/703 |
| 2015/0378631 | A1 * | 12/2015 | Gschwind | G06F 9/30047 |
| | | | | 711/130 |
| 2015/0378632 | A1 * | 12/2015 | Gschwind | G06F 9/30047 |
| | | | | 711/130 |
| 2015/0378739 | A1 * | 12/2015 | Gschwind | G06F 9/3861 |
| | | | | 712/225 |
| 2015/0378774 | A1 * | 12/2015 | Vermeulen | G06F 16/273 |
| | | | | 707/703 |
| 2015/0378779 | A1 * | 12/2015 | Busaba | G06F 9/30098 |
| | | | | 711/147 |
| 2015/0378899 | A1 * | 12/2015 | Busaba | G06F 12/0808 |
| | | | | 711/130 |
| 2015/0378901 | A1 * | 12/2015 | Bradbury | G06F 12/0811 |
| | | | | 711/122 |
| 2015/0378905 | A1 * | 12/2015 | Bradbury | G06F 12/0815 |
| | | | | 711/130 |
| 2015/0378906 | A1 * | 12/2015 | Gschwind | G06F 12/0815 |
| | | | | 711/146 |
| 2015/0378926 | A1 * | 12/2015 | Busaba | G06F 12/0891 |
| | | | | 711/141 |
| 2015/0378928 | A1 * | 12/2015 | Greiner | G06F 12/126 |
| | | | | 711/133 |
| 2016/0350116 | A1 | 12/2016 | Reddy | |
| 2016/0378662 | A1 * | 12/2016 | Gschwind | G06F 12/0833 |
| | | | | 711/135 |
| 2016/0378673 | A1 * | 12/2016 | Gschwind | G06F 12/0891 |
| | | | | 711/135 |
| 2017/0131900 | A1 * | 5/2017 | Gschwind | G06F 12/0862 |
| 2017/0132124 | A1 * | 5/2017 | Gschwind | G06F 8/4442 |
| 2017/0132133 | A1 * | 5/2017 | Gschwind | G06F 12/0862 |
| 2017/0132134 | A1 * | 5/2017 | Gschwind | G06F 8/4442 |
| 2017/0132135 | A1 * | 5/2017 | Gschwind | G06F 12/0862 |
| 2017/0132139 | A1 * | 5/2017 | Busaba | G06F 9/3005 |
| 2017/0249154 | A1 * | 8/2017 | Gschwind | G06F 12/0833 |
| 2017/0300421 | A1 * | 10/2017 | Gschwind | G06F 12/0891 |
| 2017/0322809 | A1 | 11/2017 | Gschwind | |
| 2017/0322875 | A1 * | 11/2017 | Gschwind | G06F 9/30181 |
| 2017/0322881 | A1 * | 11/2017 | Gschwind | G06F 12/0804 |
| 2017/0322884 | A1 * | 11/2017 | Gschwind | G06F 12/0804 |

OTHER PUBLICATIONS

IBM, "z/Architecture—Principles of Operation," IBM Publication No. SA22-7832-10, Eleventh Edition, Mar. 2015, pp. 1-1732.

Chung JaeWoong et al., "The Common Case Transactional Behavior of Multithreaded Programs," The Twelfth International Symposium on High Performance Computer Architecture, Feb. 2006, pp. 266-277.

Dias, Ricardo et al., "Efficient and Correct Transactional Memory Programs Combining Snapshot Isolation and Static Analysis," Proceedings of the 3rd USENIX Conference on Hot Topics in Parallelism, May 2011, pp. 1-6.

Minh, Chi Cao, et al., "An Effective Hybrid Transactional Memory System with Strong Isolation Guarantees," Proceedings of the 34th Annual International Symposium on Computer Architecture, May 2007, pp. 69-80.

Shriraman, Arrvindh et al., "Flexible Decoupled Transactional Memory Support," 35$^{th}$ International Symposium on Computer Architecture, Jun. 2008, pp. 139-150.

List of IBM Patents or Patent Applications Treated as Related dated Jul. 3, 2018, pp. 1-2.

Chung, Jaewoong et al., "ASF: AMD64 Extension for Lock-free Data Structures and Transactional Memory," 2010 43$^{rd}$ Annual IEEE/ACM International Symposium on Microarchitecture, Jan. 2010, pp. 39-50.

\* cited by examiner

READ AND WRITE SETS FOR TRANSACTIONS OF A MULTITHREADED COMPUTING ENVIRONMENT

This application is a continuation of co-pending U.S. application Ser. No. 15/145,163, entitled "READ AND WRITE SETS FOR TRANSACTIONS OF A MULTI-THREADED COMPUTING ENVIRONMENT," filed May 3, 2016, which is hereby incorporated herein by reference in its entirety.

BACKGROUND

One or more aspects relate, in general, to transactional processing, and in particular, to transactional processing in multithreaded computing environments.

Today, there are implementations of transactional execution that only allow one transaction to be present in a microprocessor. This has significant implications on the performance of transactional execution. For example, because only one transaction can be present in the pipeline, transactions cannot overlap in such designs, leading to performance degradation when transactions are used in proximity to one another. As an extension of this limitation, nested transactions become unattractive because they involve multiple transactions being in the pipeline in close proximity (i.e., an outer and an inner transaction).

In multithreaded designs, multiple transactions corresponding to multiple threads can occur concurrently. In one common implementation, transactions from all threads are jointly used to generate a single read and write set used to track the reading from and the writing to a cache. Thus, when one transaction of one thread is rolled back, all transactions in all threads are rolled back.

SUMMARY

Shortcomings of the prior art are overcome and additional advantages are provided through the provision of a computer program product for facilitating processing in a computing environment. The computer program product includes a storage medium readable by a processing circuit and storing instructions for execution by the processing circuit for performing a method. The method includes, for instance, obtaining, from a transaction executing on a processor of the computing environment, a request to access a cache of the computing environment. Based on obtaining the request, determining whether a tracking set to be used to track cache accesses is to be updated, the tracking set including a read set to track read accesses of at least a selected portion of the cache and a write set to track write accesses of at least the selected portion of the cache, the tracking set being assigned to the transaction, wherein another transaction to access at least the selected portion of the cache has another tracking set assigned thereto. Based on the determining indicating the tracking set assigned to the transaction is to be updated, updating the tracking set assigned to the transaction.

In one embodiment, the one transaction is executing on one thread of a processor and the other transaction is executing on another thread.

As an example, the determining whether the tracking set to be used to track cache accesses is to be updated includes checking whether the transaction is determined to be a younger transaction as compared to a selected other transaction of the computing environment, and wherein the updating is performed based on the transaction being determined to be the younger transaction.

In a further embodiment, one or more chosen transactions are aborted based on the checking indicating the transaction is older than the selected other transaction.

In one example, the request to access the cache includes a read access, and the selected other transaction includes a transaction determined to be a youngest transaction to perform a write to at least the selected portion of the cache as compared to other transactions writing to at least the selected portion of the cache. The checking is performed, for instance, based on determining that one or more write sets of at least the selected portion of the cache is marked by one or more different transactions than the transaction issuing the request.

In another example, the request to access the cache includes a write access, and the selected other transaction includes a transaction determined to be a youngest transaction to access at least the selected portion of the cache as compared to other transactions accessing at least the selected portion of the cache. The checking is performed, for instance, based on determining that one or more tracking sets of at least the selected portion of the cache is marked by one or more different transactions than the transaction issuing the request.

In one embodiment, the request includes a read access and the determining whether the tracking set to be used to track cache accesses is to be updated includes determining whether one or more other write sets of at least the selected portion of the cache is marked by one or more transactions other than the transaction issuing the request, and wherein the updating the tracking set assigned to the transaction is performed based on the one or more other write sets being unmarked, wherein the updating the tracking set includes updating the read set of the tracking set.

In another embodiment, the request includes a write access and the determining whether the tracking set to be used to track cache accesses is to be updated includes determining whether one or more other tracking sets of at least the selected portion of the cache is marked by one or more transactions other than the transaction issuing the request, and wherein the updating the tracking set assigned to the transaction is performed based on the one or more other tracking sets being unmarked, wherein the updating the tracking set includes updating the write set of the tracking set.

In yet a further embodiment, the request includes a read access, and the determining whether the tracking set to be used to track cache accesses is to be updated includes determining whether the read access is compatible with one or more tracking sets of one or more transactions, and wherein the updating is performed based on the read access being compatible, the updating including updating the read set.

In another embodiment, the request includes a write access, and the determining whether the tracking set to be used to track cache accesses is to be updated includes determining whether the write access is compatible with one or more tracking sets of one or more transactions, and wherein the updating is performed based on the write access being compatible, the updating including updating the write set.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and other objects, features, and advantages of one or more aspects are apparent from the following detailed description taken in conjunction with the accompanying drawings in which:

DETAILED DESCRIPTION

Figure 1B:
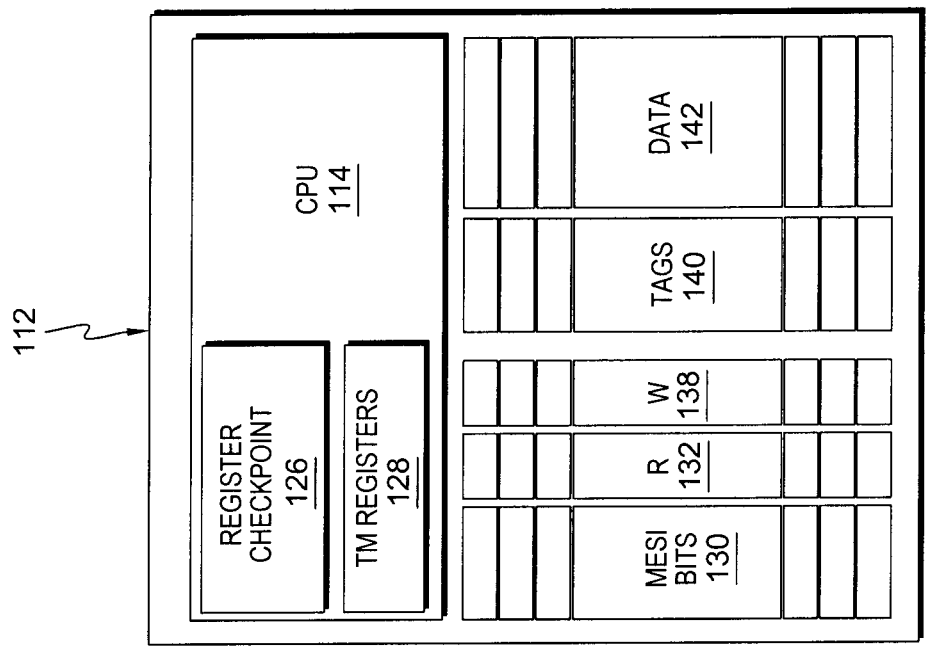
FIGS. 1A-1B depict one example of a transactional memory environment, in accordance with an aspect of the present invention.

In accordance with an aspect of the present invention, read and write sets are tracked per transaction of a computing environment. In one embodiment, the computing environment is a multithreaded computing environment, and each thread may execute a single transaction at a time. In such cases, read and write sets are tracked per transaction or per thread. In a further embodiment, a thread may execute one or more transactions, and in such an embodiment, the read and write sets are tracked per transaction.

Transactional execution is a part of, for instance, a transactional execution facility provided by computing architectures, such as the z/Architecture offered by International Business Machines Corporation, Armonk, N.Y. z/Architecture is a registered trademark of International Business Machines Corporation, Armonk, N.Y., USA. One embodiment of the z/Architecture is described in "z/Architecture Principles of Operation," IBM Publication No. SA22-7832-10, March 2015, which is hereby incorporated herein by reference in its entirety.

In such environments, the processor (e.g., central processing unit (CPU)) enters transactional execution (TX) mode by a TRANSACTION BEGIN instruction. Further, the CPU leaves transactional execution mode by either (a) an outermost TRANSACTION END (TEND) instruction (more details on inner and outer to follow), or (b) the transaction being aborted. While in transactional execution mode, storage accesses by the CPU appear to be block-concurrent as observed by other CPUs and the I/O subsystem. The storage accesses are either (a) committed to storage when the outermost transaction ends without aborting (i.e., e.g., updates made in a cache or buffer local to the CPU are propagated and stored in real memory and visible to other CPUs), or (b) discarded if the transaction is aborted.

Transactions may be nested. That is, while the CPU is in transactional execution mode, it may execute another TRANSACTION BEGIN instruction. The instruction that causes the CPU to enter transactional execution mode is called the outermost TRANSACTION BEGIN; similarly, the program is said to be in the outermost transaction. Subsequent executions of TRANSACTION BEGIN are called inner instructions; and the program is executing an inner transaction. The model provides a minimum nesting depth and a model-dependent maximum nesting depth. An EXTRACT TRANSACTION NESTING DEPTH instruction returns the current nesting depth value, and in a further embodiment, may return a maximum nesting-depth value. This technique uses a model called "flattened nesting" in which an aborting condition at any nesting depth causes all levels of the transaction to be aborted, and control is returned to the instruction following the outermost TRANSACTION BEGIN.

During processing of a transaction, a transactional access made by one CPU is said to conflict with either (a) a transactional access or a nontransactional access made by another CPU, or (b) a nontransactional access made by the I/O subsystem, if both accesses are to any location within the same cache line, and one or both of the accesses is a store. In other words, in order for transactional execution to be productive, the CPU is not to be observed making transactional accesses until it commits. This programming model may be highly effective in certain environments; for example, the updating of two points in a doubly-linked list of a million elements. However, it may be less effective, if there is a lot of contention for the storage locations that are being transactionally accessed.

In one model of transactional execution (referred to herein as a nonconstrained transaction), when a transaction is aborted, the program may either attempt to re-drive the transaction in the hopes that the aborting condition is no longer present, or the program may "fall back" to an equivalent non-transactional path. In another model of transactional execution (referred to herein as a constrained transaction), an aborted transaction is automatically re-driven by the CPU; in the absence of constraint violations, the constrained transaction is assured of eventual completion.

When initiating a transaction, the program can specify various controls, such as (a) which general registers are restored to their original contents if the transaction is aborted, (b) whether the transaction is allowed to modify the floating-point-register context, including, for instance, floating point registers and the floating point control register, (c) whether the transaction is allowed to modify access registers (ARs), and (d) whether certain program-exception conditions are to be blocked from causing an interruption. If a nonconstrained transaction is aborted, various diagnostic information may be provided. For instance, the outermost TRANSACTION BEGIN instruction that initiates a nonconstrained transaction may designate a program specified transaction diagnostic block (TDB). Further, the TDB in the CPU's prefix area or designated by the host's state description may also be used if the transaction is aborted due to a program interruption or a condition that causes interpretative execution to end, respectively.

In one embodiment, the transactional execution facility includes, for instance, one or more controls; one or more instructions (e.g., TRANSACTION BEGIN to initiate a transaction; TRANSACTION END to end a transaction; TRANSACTION ABORT to abort a transaction, etc.); transactional processing, including constrained and nonconstrained execution; and abort processing. Aspects of this facility, including various terms used with respect to the transactional execution facility, are described below, in alphabetical order for convenience.

Abort: A transaction aborts when it is ended prior to a TRANSACTION END instruction that results in a transaction nesting depth of zero. When a transaction aborts, the following occurs, in one embodiment:

Transactional store accesses made by any and all levels of the transaction are discarded (that is, not committed).

Non-transactional store accesses made by any and all levels of the transaction are committed.

Registers designated by a general register save mask (GRSM) of the outermost TRANSACTION BEGIN instruction are restored to their contents prior to the transactional execution (that is, to their contents at execution of the outermost TRANSACTION BEGIN instruction). General registers not designated by the general register save mask of the outermost TRANSACTION BEGIN instruction are not restored.

Access registers, floating-point registers, and the floating-point control register are not restored. Any changes made to these registers during transaction execution are retained when the transaction aborts.

A transaction may be aborted due to a variety of reasons, including attempted execution of a restricted instruction, attempted modification of a restricted resource, transactional conflict, exceeding various CPU resources, any interpretive-execution interception condition, any interruption, a TRANSACTION ABORT instruction, and other reasons. A transaction-abort code provides specific reasons why a transaction may be aborted.

Commit: At the completion of an outermost TRANSACTION END instruction, the CPU commits the store accesses made by the transaction (i.e., the outermost transaction and any nested levels) such that they are visible to other CPUs and the I/O subsystem. As observed by other CPUs and by the I/O subsystem, all fetch and store accesses made by all nested levels of the transaction appear to occur as a single concurrent operation when the commit occurs.

The contents of the general registers, access registers, floating-point registers, and the floating-point control register are not modified by the commit process. Any changes made to these registers during transactional execution are retained when the transaction's stores are committed.

Conflict: A transactional access made by one CPU conflicts with either (a) a transactional access or a non-transactional access made by another CPU, or (b) the non-transactional access made by the I/O subsystem, if both accesses are to any location within the same cache line, and one or more of the accesses is a store.

A conflict may be detected by a CPU's speculative execution of instructions, even though the conflict may not be detected in the conceptual sequence.

Constrained Transaction: A constrained transaction is a transaction that executes in the constrained transactional execution mode and is subject to the following limitations:

A subset of the general instructions is available.

A limited number of instructions may be executed.

A limited number of storage-operand locations may be accessed.

The transaction is limited to a single nesting level.

In the absence of repeated interruptions or conflicts with other CPUs or the I/O subsystem, a constrained transaction eventually completes, thus an abort-handler routine is not required.

When a TRANSACTION BEGIN constrained (TBEGINC) instruction is executed while the CPU is already in the nonconstrained transaction execution mode, execution continues as a nested nonconstrained transaction.

Constrained Transactional Execution Mode: When the transaction nesting depth is zero, and a transaction is initiated by a TBEGINC instruction, the CPU enters the constrained transactional execution mode. While the CPU is in the constrained transactional execution mode, the transaction nesting depth is one.

Nested Transaction: When the TRANSACTION BEGIN instruction is issued while the CPU is in the nonconstrained transactional execution mode, the transaction is nested.

The transactional execution facility uses a model called flattened nesting. In the flattened nesting mode, stores made by an inner transaction are not observable by other CPUs and by the I/O subsystem until the outermost transaction commits its stores. Similarly, if a transaction aborts, all nested transactions abort, and all transactional stores of all nested transactions are discarded.

Nonconstrained Transaction: A nonconstrained transaction is a transaction that executes in the nonconstrained transactional execution mode. Although a nonconstrained transaction is not limited in the manner as a constrained transaction, it may still be aborted due to a variety of causes.

Nonconstrained Transactional Execution Mode: When a transaction is initiated by a TRANSACTION BEGIN nonconstrained (TBEGIN) instruction, the CPU enters the nonconstrained transactional execution mode. While the CPU is in the nonconstrained transactional execution mode, the transaction nesting depth may vary from one to the maximum transaction nesting depth.

Non-Transactional Access: Non-transactional accesses are storage operand accesses made by the CPU when it is not in the transactional execution mode (that is, classic storage accesses outside of a transaction). Further, accesses made by the I/O subsystem are non-transactional accesses. Additionally, a NONTRANSACTIONAL STORE instruction may be used to cause a non-transactional store access while the CPU is in the nonconstrained transactional execution mode.

Outer/Outermost Transaction: A transaction with a lower-numbered transaction nesting depth is an outer transaction. A transaction with a transaction nesting depth value of one is the outermost transaction.

An outermost TRANSACTION BEGIN instruction is one that is executed when the transaction nesting depth is initially zero. An outermost TRANSACTION END instruction is one that causes the transaction nesting depth to transition from one to zero. A constrained transaction is the outermost transaction, in this embodiment.

Program Interruption Filtering: When a transaction is aborted due to certain program exception conditions, the program can optionally prevent the interruption from occurring. This technique is called program-interruption filtering. Program interruption filtering is subject to the transactional class of the interruption, the effective program interruption filtering control from the TRANSACTION BEGIN instruction, and the transactional execution program interruption filtering override in, e.g., control register 0.

Transaction: A transaction includes the storage-operand accesses made, and selected general registers altered, while the CPU is in the transactional execution mode. For a nonconstrained transaction, storage-operand accesses may include both transactional accesses and non-transactional accesses. For a constrained transaction, storage-operand accesses are limited to transactional accesses. As observed by other CPUs and by the I/O subsystem, all storage-operand accesses made by the CPU while in the transactional execution mode appear to occur as a single concurrent operation. If a transaction is aborted, transactional store accesses are discarded, and any registers designated by the general register save mask of the outermost TRANSACTION BEGIN instruction are restored to their contents prior to transactional execution.

Transactional Accesses: Transactional accesses are storage operand accesses made while the CPU is in the transactional execution mode, with the exception of accesses made by the NONTRANSACTIONAL STORE instruction.

Transactional Execution Mode: The term transactional execution mode (a.k.a., transaction execution mode) describes the common operation of both the nonconstrained and the constrained transactional execution modes. Thus, when the operation is described, the terms nonconstrained and constrained are used to qualify the transactional execution mode.

When the transaction nesting depth is zero, the CPU is not in the transactional execution mode (also called the non-transactional execution mode).

As observed by the CPU, fetches and stores made in the transactional execution mode are no different than those made while not in the transactional execution mode.

In one embodiment of the z/Architecture, the transactional execution facility is under the control of bits 8-9 of control register 0, bits 61-63 of control register 2, the transaction nesting depth, the transaction diagnostic block address, and the transaction abort program status word (PSW).

Following an initial CPU reset, the contents of bit positions 8-9 of control register 0, bit positions 62-63 of control register 2, and the transaction nesting depth are set to zero. When the transactional execution control, bit 8 of control register 0, is zero, the CPU cannot be placed into the transactional execution mode.

Further details regarding the various controls are described below.

As indicated, the transactional execution facility is controlled by two bits in control register zero and three bits in control register two. For instance:

Control Register 0 Bits: The bit assignments are as follows, in one embodiment:

Transactional Execution Control (TXC): Bit 8 of control register zero is the transactional execution control. This bit provides a mechanism whereby the control program (e.g., operating system) can indicate whether or not the transactional execution facility is usable by the program. Bit 8 is to be one to successfully enter the transactional execution mode.

When bit 8 of control register 0 is zero, attempted execution of the EXTRACT TRANSACTION NESTING DEPTH, TRANSACTION BEGIN and TRANSACTION END instructions results in a special operation execution.

Transaction Execution Program Interruption Filtering Override (PIFO): Bit 9 of control register zero is the transactional execution program interruption filtering override. This bit provides a mechanism by which the control program can ensure that any program exception condition that occurs while the CPU is in the transactional execution mode results in an interruption, regardless of the effective program interruption filtering control specified or implied by the TRANSACTION BEGIN instruction(s).

Control Register 2 Bits: The assignments are as follows, in one embodiment:

Transaction Diagnostic Scope (TDS): Bit 61 of control register 2 controls the applicability of the transaction diagnosis control (TDC) in bits 62-63 of the register, as follows:

TDS
  Value Meaning
  0 The TDC applies regardless of whether the CPU is in the problem or supervisor state.
  1 The TDC applies only when the CPU is in the problem state. When the CPU is in the supervisor state, processing is as if the TDC contained zero.

Transaction Diagnostic Control (TDC): Bits 62-63 of control register 2 are a 2-bit unsigned integer that may be used to cause transactions to be randomly aborted for diagnostic purposes. The encoding of the TDC is as follows, in one example:

TDC
  Value Meaning
  0 Normal operation; transactions are not aborted as a result of the TDC.
  1 Abort every transaction at a random instruction, but before execution of the outermost TRANSACTION END instruction.
  2 Abort random transactions at a random instruction.
  3 Reserved When a transaction is aborted due to a nonzero TDC, then either of the following may occur:

The abort code is set to any of the codes 7-11, 13-16, or 255, with the value of the code randomly chosen by the CPU; the condition code is set corresponding to the abort code.

For a nonconstrained transaction, the condition code is set to one. In this case, the abort code is not applicable.

It is model dependent whether TDC value 1 is implemented. If not implemented, a value of 1 acts as if 2 was specified.

For a constrained transaction, a TDC value of 1 is treated as if a TDC value of 2 was specified.

If a TDC value of 3 is specified, the results are unpredictable.

Transaction Diagnostic Block Address (TDBA)

A valid transaction diagnostic block address (TDBA) is set from the first operand address of the outermost TRANSACTION BEGIN (TBEGIN) instruction when the $B_1$ field of the instruction is nonzero. When the CPU is in the primary space or access register mode, the TDBA designates a location in the primary address space. When the CPU is in the secondary space, or home space mode, the TDBA designates a location in the secondary or home address space, respectively. When DAT (Dynamic Address Translation) is off, the TDBA designates a location in real storage.

The TDBA is used by the CPU to locate the transaction diagnostic block—called the TBEGIN-specified TDB—if the transaction is subsequently aborted. The rightmost three bits of the TDBA are zero, meaning that the TBEGIN-specified TDB is on a doubleword boundary.

When the $B_1$ field of an outermost TRANSACTION BEGIN (TBEGIN) instruction is zero, the transactional diagnostic block address is invalid, and no TBEGIN-specified TDB is stored if the transaction is subsequently aborted.

Transaction Abort PSW (TAPSW)

During execution of the TRANSACTION BEGIN (TBEGIN) instruction when the nesting depth is initially zero, the transaction abort PSW is set to the contents of the current PSW; and the instruction address of the transaction abort PSW designates the next sequential instruction (that is, the instruction following the outermost TBEGIN). During execution of the TRANSACTION BEGIN constrained (TBEGINC) instruction when the nesting depth is initially zero, the transaction abort PSW is set to the contents of the current PSW, except that the instruction address of the transaction abort PSW designates the TBEGINC instruction (rather than the next sequential instruction following the TBEGINC).

When a transaction is aborted, the condition code in the transaction abort PSW is replaced with a code indicating the severity of the abort condition. Subsequently, if the transaction was aborted due to causes that do not result in an interruption, the PSW is loaded from the transaction abort PSW; if the transaction was aborted due to causes that result in an interruption, the transaction abort PSW is stored as the interruption old PSW.

The transaction abort PSW is not altered during the execution of any inner TRANSACTION BEGIN instruction.

Transaction Nesting Depth (TND)

The transaction nesting depth is, for instance, a 16-bit unsigned value that is incremented each time a TRANSACTION BEGIN instruction is completed with condition code 0 and decremented each time a TRANSACTION END instruction is completed. The transaction nesting depth is reset to zero when a transaction is aborted or by CPU reset.

In one embodiment, a maximum TND of 15 is implemented.

In one implementation, when the CPU is in the constrained transactional execution mode, the transaction nesting depth is one. Additionally, although the maximum TND can be represented as a 4-bit value, the TND is defined to be a 16-bit value to facilitate its inspection in the transaction diagnostic block.

Transaction Diagnostic Block (TDB)

When a transaction is aborted, various status information may be saved in a transaction diagnostic block (TDB), as follows:

1. TBEGIN-specified TDB: For a nonconstrained transaction, when the $B_1$ field of the outermost TBEGIN instruction is nonzero, the first operand address of the instruction designates the TBEGIN-specified TDB. This is an application program specified location that may be examined by the application's abort handler.
2. Program-Interruption (PI) TDB: If a nonconstrained transaction is aborted due to a non-filtered program exception condition, or if a constrained transaction is aborted due to any program exception condition (that is, any condition that results in a program interruption being recognized), the PI-TDB is stored into locations in the prefix area. This is available for the operating system to inspect and log out in any diagnostic reporting that it may provide.
3. Interception TDB: If the transaction is aborted due to any program exception condition that results in interception (that is, the condition causes interpretive execution to end and control to return to the host program), a TDB is stored into a location specified in the state description block for the guest operating system.

The TBEGIN-specified TDB is only stored, in one embodiment, when the TDB address is valid (that is, when the outermost TBEGIN instruction's $B_1$ field is nonzero).

For aborts due to unfiltered program exception conditions, only one of either the PI-TDB or Interception TDB will be stored. Thus, there may be zero, one, or two TDBs stored for an abort.

Further details regarding one example of each of the TDBs are described below:

TBEGIN-specified TDB: The 256-byte location specified by a valid transaction diagnostic block address. When the transaction diagnostic block address is valid, the TBEGIN-specified TDB is stored on a transaction abort. The TBEGIN-specified TDB is subject to all storage protection mechanisms that are in effect at the execution of the outermost TRANSACTION BEGIN instruction. A PER (Program Event Recording) storage alteration event for any portion of the TBEGIN-specified TDB is detected during the execution of the outermost TBEGIN, not during the transaction abort processing.

One purpose of PER is to assist in debugging programs. It permits the program to be alerted to the following types of events, as examples:

Execution of a successful branch instruction. The option is provided of having an event occur only when the branch target location is within the designated storage area.

Fetching of an instruction from the designated storage area.

Alteration of the contents of the designated storage area. The option is provided of having an event occur only when the storage area is within designated address spaces.

Execution of a STORE USING REAL ADDRESS instruction.

Execution of the TRANSACTION END instruction.

The program can selectively specify that one or more of the above types of events be recognized, except that the event for STORE USING REAL ADDRESS can be specified only along with the storage alteration event. The information concerning a PER event is provided to the program by means of a program interruption, with the cause of the interruption being identified in the interruption code.

When the transaction diagnostic block address is not valid, a TBEGIN-specified TDB is not stored.

Program-Interruption TDB: Real locations 6,144-6,399 (1800-18FF hex). The program interruption TDB is stored when a transaction is aborted due to program interruption. When a transaction is aborted due to other causes, the contents of the program interruption TDB are unpredictable.

The program interruption TDB is not subject to any protection mechanism. PER storage alteration events are not detected for the program interruption TDB when it is stored during a program interruption.

Interception TDB: The 256-byte host real location specified by locations 488-495 of the state description. The interception TDB is stored when an aborted transaction results in a guest program interruption interception (that is, interception code 8). When a transaction is aborted due to other causes, the contents of the interception TDB are unpredictable. The interception TDB is not subject to any protection mechanism.

Figure 1A:
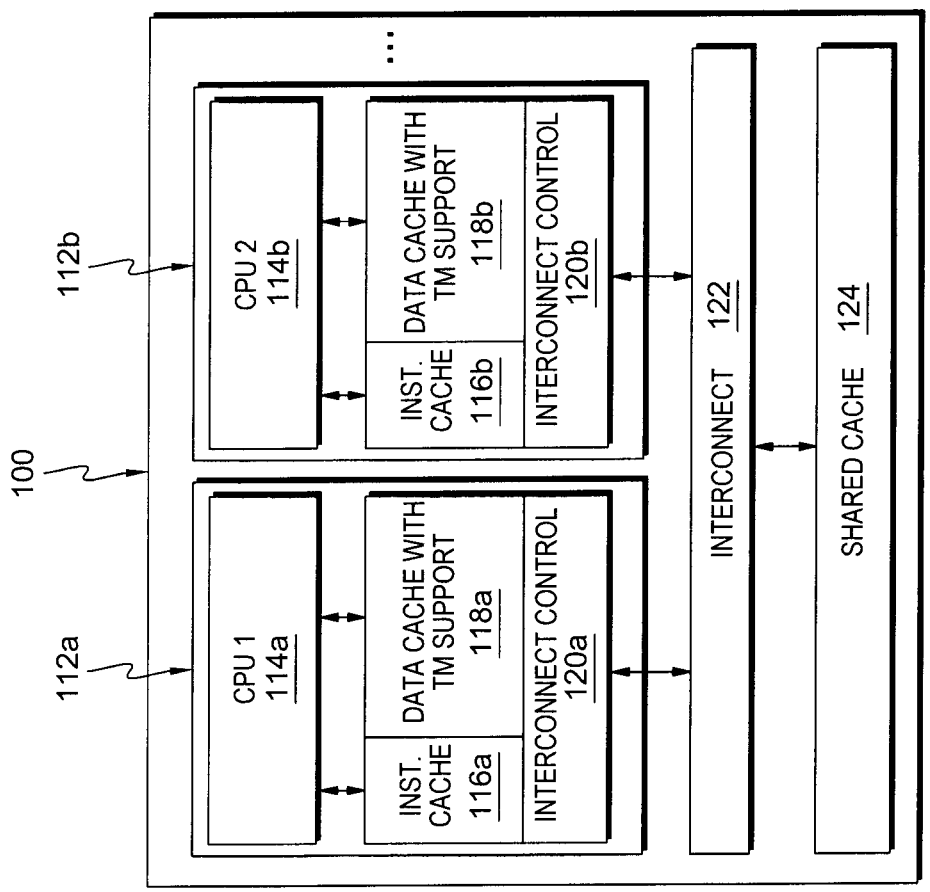

One example of a multicore transactional memory (TM) environment to incorporate and/or use one or more aspects of the present invention is depicted in FIGS. 1A and 1B. Referring initially to FIG. 1A, a number of TM-enabled CPUs (CPU 1 114a, CPU 2 114b, etc.) are located on one semiconductor chip (a.k.a., die) 100, connected with an interconnect 122, under management of an interconnect control 120a, 120b, respectively. Each CPU 114a, 114b (also known as a processor) may have a split cache including an instruction cache 116a, 116b for caching instructions from memory to be executed, and a data cache 118a, 118b with transactional memory support for caching data (operands) of memory locations to be operated on by CPU 114a, 114b. (In FIG. 1A, each CPU 114a, 114b and its associated caches are referenced as 112a, 112b, respectively.)

In an implementation, caches of multiple chips 100 are interconnected to support cache coherency between the caches of the multiple chips 100. In an implementation, a single cache, rather than the split cache is employed holding both instructions and data. In implementations, the CPU caches are one level of caching in a hierarchical cache structure. For example, each chip 100 may employ a shared cache 124 to be shared among all the CPUs on chip 100. In another implementation, each chip may have access to a shared cache 124, shared among all the processors of all the chips 100.

FIG. 1B shows details of an example transactional CPU environment 112, having a CPU 114, including additions to support transactional memory. The transactional CPU (processor) 114 may include hardware for supporting register checkpoints 126 and special transactional memory registers 128. The transactional CPU cache may have cache line state indictors 130 (e.g., modified (M), exclusive (E), shared (S), and invalid (I), MESI bits), described below; tags 140 and data 142 of a conventional cache; read (R) bits 132 showing a cache line has been read by the CPU 114 while executing a transaction; and write (W) bits 138 showing a cache line has been written to by the CPU 114 while executing a transaction.

In one example, MESI coherency rules provide for four possible states in which a cache line of a multiprocessor cache system may reside, M, E, S, and I, defined as follows:
  Modified (M): The cache line is present only in the current cache, and is dirty; it has been modified from the value in main memory. The cache is required to write the data back to main memory at some time in the future, before permitting any other read of the (no longer valid) main memory state. The write-back changes the line to the exclusive state.
  Exclusive (E): The cache line is present only in the current cache, but is clean; it matches main memory. It may be changed to the shared state at any time, in response to a read request. Alternatively, it may be changed to the modified state when writing to it.
  Shared (S): Indicates that this cache line may be stored in other caches of the machine and is "clean"; it matches the main memory. The line may be discarded (changed to the invalid state) at any time.
  Invalid (I): Indicates that this cache line is invalid (unused).

Figure 2:
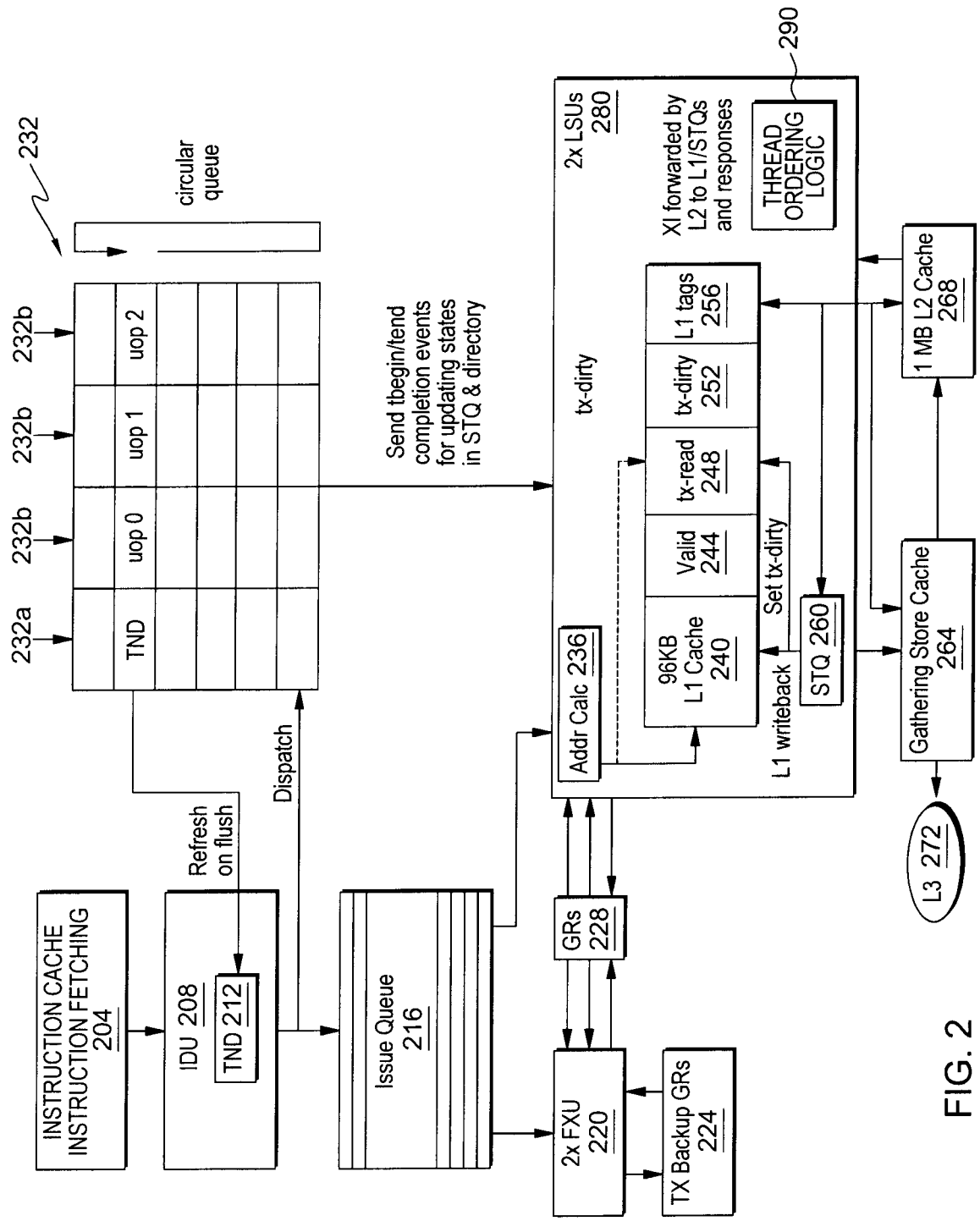
FIG. 2 depicts further details of example components of the transactional memory environment of FIGS. 1A-1B, in accordance with an aspect of the present invention.

Components of an example transactional execution environment, including a CPU and caches/components with which it interacts (such as those depicted in FIGS. 1A and 1B), are described with reference to FIG. 2. In one embodiment, referring to FIG. 2, an instruction decode unit 208 (IDU) keeps track of the current transaction nesting depth 212 (TND). When IDU 208 receives a TBEGIN instruction from, e.g., instruction cache 204, nesting depth 212 is incremented, and conversely decremented on TEND instructions. Nesting depth 212 is written into a global completion table (GCT) 232 for every dispatched instruction (see 232a). When a TBEGIN or TEND is decoded on a speculative path that later gets flushed, the IDU's 208 nesting depth 212 is refreshed from the youngest GCT 232 entry that is not flushed. The transactional state is also written into an issue queue 216 for consumption by the execution units, mostly by a load/store unit (LSU) 280, which also has an effective address calculator 236 included in LSU 280. The TBEGIN instruction may specify a transaction diagnostic block (TDB) for recording status information, should the transaction abort before reaching a TEND instruction.

Similar to the nesting depth, IDU 208/GCT 232 collaboratively track the access register/floating-point register (AR/FPR) modification masks through the transaction nest; IDU 208 can place an abort request into GCT 232 when an AR/FPR-modifying instruction is decoded and the modification mask blocks it. When the instruction becomes next-to-complete, completion is blocked and the transaction aborts. Other restricted instructions are handled similarly, including TBEGIN if decoded while in a constrained transaction, or exceeding the maximum nesting depth.

An outermost TBEGIN is split into multiple micro-operations (uops) depending on the GR (general register) save mask of the TBEGIN; each micro-op 232b (including, for example uop 0, uop 1, and uop 2) is to be executed by one of the two fixed point units (FXUs) 220 to save a pair of GRs 228 into a special transaction-backup register file 224, that is used to later restore the GR 228 content in case of a transaction abort. Also, the TBEGIN spawns micro-ops 232b to perform an accessibility test for the TDB if one is specified; the address is saved in a special purpose register for later use in the abort case. At the decoding of an outermost TBEGIN, the instruction address and the instruction text of the TBEGIN are also saved in special purpose registers for potential abort processing later on.

TEND and NTSTG (non-transactional store) are single micro-op 232b instructions; NTSTG is handled like a normal store except that it is marked as non-transactional in issue queue 216 so that LSU 280 can treat it appropriately. TEND is a no-op at execution time; the ending of the transaction is performed when TEND completes.

As mentioned, instructions that are within a transaction are marked as such in issue queue 216, but otherwise, execute mostly unchanged. LSU 280 performs isolation tracking.

Since decoding is in-order, and since IDU 208 keeps track of the current transactional state and writes it into issue queue 216 along with every instruction from the transaction, execution of TBEGIN, TEND, and instructions before, within, and after the transaction can be performed out-of-order. It is even possible (though unlikely) that TEND is executed first, then the entire transaction, and lastly the TBEGIN executes. Program order is restored through GCT 232 at completion time. The length of a transaction is not limited by the size of GCT 232, since general purpose registers (GRs) 228 can be restored from the backup register file 224.

During execution, program event recording (PER) events are filtered based on an event suppression control, and a PER TEND event is detected if enabled. Similarly, while in transactional mode, a pseudo-random generator may be causing random aborts as enabled by the Transaction Diagnostic Control.

Load/Store Unit 280 tracks cache lines that were accessed during transactional execution, and triggers an abort if a cross-invalidate (XI) from another CPU (or an LRU-XI—least recently used-cross-invalidate—i.e., an eviction of the least recently used entry) conflicts with the footprint. If the conflicting XI is an exclusive or demote XI, LSU 280 rejects the XI back to an L3 cache 272 (a.k.a., L3 272) in the hope of finishing the transaction before L3 272 repeats the XI. This "stiff-arming" is very efficient in highly contended transactions. In order to prevent hangs when two CPUs stiff-arm each other, a XI-reject counter is implemented, which triggers a transaction abort when a threshold is met.

An L1 cache directory 240 is traditionally implemented with static random access memories (SRAMs). For the transactional memory implementation, valid bits 244 (64 rows×6 ways) of the directory have been moved into normal logic latches, and are supplemented with two more bits per cache line: tx-read bits 248 and tx-dirty bits 252. (In an aspect of the present invention, there may be one or more tx-read bits 248 and one or more tx-dirty bits 252 per cache line (e.g., one for each transaction per cache line), as described further below.)

TX-read bits 248 are reset when a new outermost TBEGIN is decoded (which is interlocked against a prior still pending transaction). A tx-read bit 248 is set at execution time by every load instruction that is marked "transactional" in the issue queue.

Stores execute the same way as in non-transactional mode, but a transaction mark is placed in a store queue (STQ) 260 entry of the store instruction. At write-back time, when the data from STQ 260 is written into L1 240, tx-dirty bit 252 in an L1-directory is set for the written cache line. A store write-back into L1 240 occurs after the store instruction has completed, and at most one store is written back per cycle, in one example. Before completion and write-back, loads can access the data from STQ 260 by means of store-forwarding; after write-back, CPU 114 (FIG. 1B) can access the speculatively updated data in L1 240. If the transaction ends successfully, tx-dirty bits 252 of all cache-lines are cleared, and also the tx-marks of not yet written stores are cleared in STQ 260, effectively turning the pending stores into normal stores.

On a transaction abort, all pending transactional stores are invalidated from STQ 260, even those already completed. All cache lines that were modified by the transaction in L1 240, that is, have tx-dirty bit 252 on, have their valid bits turned off, effectively removing them from the L1 240 cache instantaneously.

In one embodiment of the architecture, before completing a new instruction, the isolation of the transaction read- and write-set (e.g., tx-read 248, tx-dirty 252) is maintained. This isolation is ensured by stalling instruction completion at appropriate times when XIs are pending; speculative out-of-order execution is allowed, optimistically assuming that the pending XIs are to different addresses and do not actually cause a transaction conflict. This design fits very naturally with the XI-vs-completion interlocks that are implemented on prior systems to ensure the strong memory ordering of the architecture.

When L1 240 receives an XI, L1 240 accesses the directory to check validity of the XI'ed address in L1 240, and if TX-read bit 248 is active on the XI'ed line and the XI is not rejected, LSU 280 triggers an abort. When a cache line with an active tx-read bit 248 is the least recently used cache line from L1 240, a special LRU-extension vector remembers for each of the 64 rows of L1 240 that a tx-read line existed on that row. Since no precise address tracking exists for the LRU extensions, any non-rejected XI that hits a valid extension row LSU 280 triggers an abort. Providing the LRU-extension effectively increases the read footprint capability from the L1-size to the L2-size and associativity, provided no conflicts with other CPUs 114 (FIGS. 1A and 1B) against the non-precise LRU-extension tracking causes aborts.

The store footprint is limited by the store cache size, and thus, implicitly by the L2 268 size and associativity. No LRU-extension action needs to be performed when a tx-dirty 252 cache line is the least recently used cache line from L1 240.

In prior systems, since L1 240 and L2 268 are store-through caches, every store instruction causes an L3 272 store access; with now, e.g., 6 cores per L3 272 and further improved performance of each core, the store rate for L3 272 (and to a lesser extent for L2 268) becomes problematic for certain workloads. In order to avoid store queuing delays, a gathering store cache 264 has been added, that combines stores to neighboring addresses before sending them to L3 272.

For transactional memory performance, it is acceptable to invalidate every tx-dirty 252 cache line from L1 240 on transaction aborts, because the L2 268 cache is very close (7 cycles L1 240 miss penalty) to bring back the clean lines. However, it may be unacceptable for performance (and silicon area for tracking) to have transactional stores write the L2 268 before the transaction ends and then invalidate all dirty L2 268 cache lines on abort (or even worse on the shared L3 272).

The two problems of store bandwidth and transactional memory store handling can both be addressed with the gathering store cache 264. Cache 264 is a circular queue of, e.g., 64 entries, each entry holding, e.g., 128 bytes of data with byte-precise valid bits. In non-transactional operation, when a store is received from LSU 280, store cache 264 checks whether an entry exists for the same address, and if so gathers the new store into the existing entry. If no entry exists, a new entry is written into the queue, and if the number of free entries falls under a threshold, the oldest entries are written back to L2 268 and L3 272 caches.

When a new outermost transaction begins, all existing entries in the store cache are marked closed so that no new stores can be gathered into them, and eviction of those entries to L2 268 and L3 272 is started. From that point on, the transactional stores coming out of LSU 280 STQ 260 allocate new entries, or gather into existing transactional entries. The write-back of those stores into L2 268 and L3 272 is blocked, until the transaction ends successfully; at that point, subsequent (post-transaction) stores can continue to gather into existing entries, until the next transaction closes those entries again.

Store cache 264 is queried on every exclusive or demote XI, and causes an XI reject if the XI compares to any active entry. If the core is not completing further instructions while continuously rejecting XIs, the transaction is aborted at a certain threshold to avoid hangs.

LSU 280 requests a transaction abort when store cache 264 overflows. LSU 280 detects this condition when it tries to send a new store that cannot merge into an existing entry, and the entire store cache 264 is filled with stores from the current transaction. Store cache 264 is managed as a subset of L2 268: while transactionally dirty lines can be evicted from L1 240, they are to stay resident in L2 268 throughout the transaction. The maximum store footprint is thus limited to the store cache size of, for instance, 64×128 bytes, and it is also limited by the associativity of L2 268. Since the L2 268 is, in this example, 8-way associative and has 512 rows, it is typically large enough to not cause transaction aborts.

If a transaction aborts, store cache 264 is notified and all entries holding transactional data are invalidated. Store cache 264 also has a mark per doubleword (8 bytes) whether the entry was written by a NTSTG instruction—those doublewords stay valid across transaction aborts.

In one embodiment, load store unit 280 also includes thread ordering logic 290 used in accordance with an aspect of the present invention, and described further below.

Figure 3:
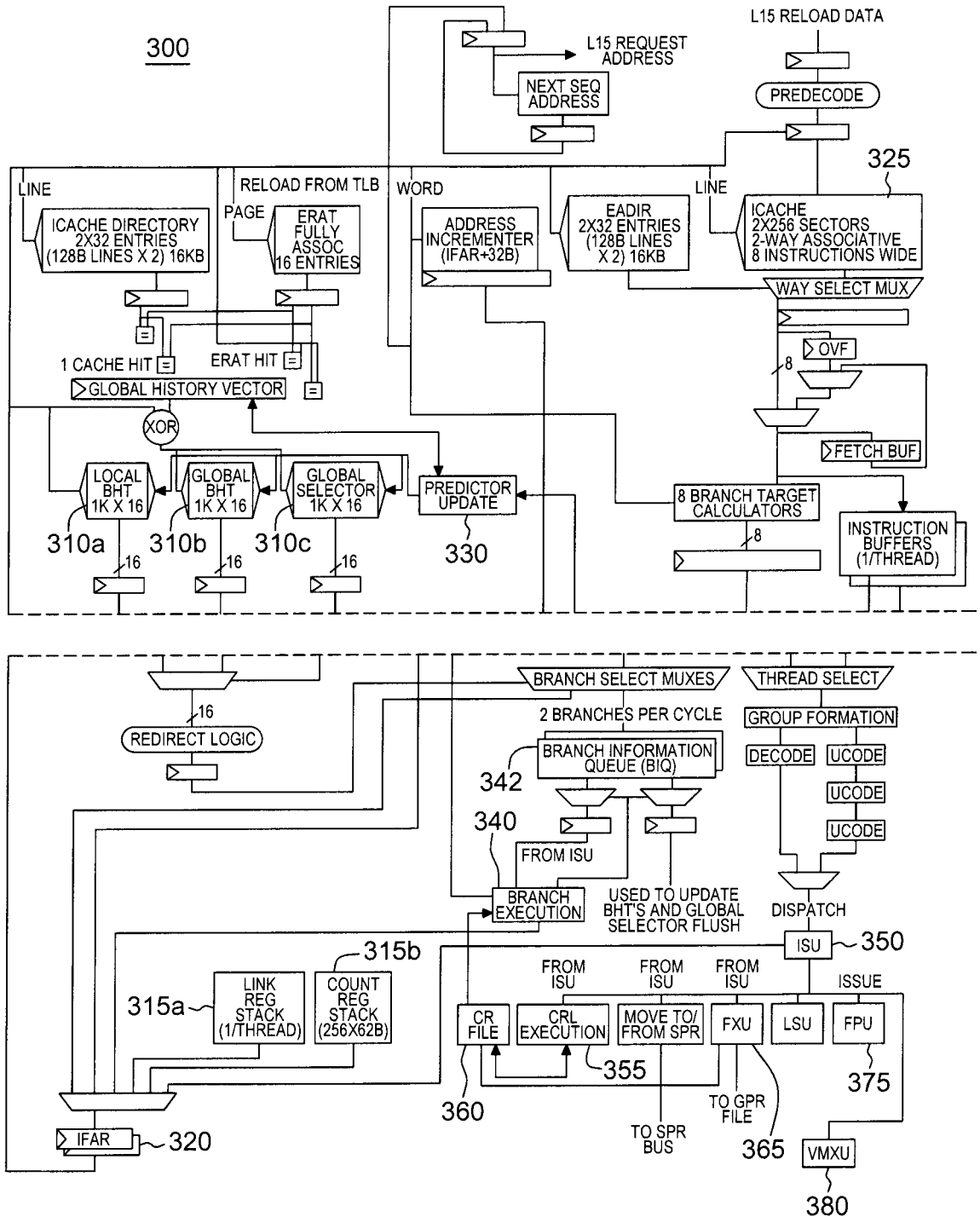
FIG. 3 depicts one example of a processor to incorporate and use one or more aspects of the present invention.

As described herein, speculative processing may be performed in both transactional and nontransactional processing. This speculative processing includes use of predictor logic. One example of a processor that includes predictor logic is depicted in FIG. 3. Referring to FIG. 3, a processor 300 (i.e., a pipelined processor) with predictor update logic is depicted. Processor 300 includes, among other things, prediction hardware, registers, caches, decoders, an instruction sequencing unit (ISU) 350, and instruction execution units. In particular, the prediction hardware includes a local branch history table (BHT) 310*a*, a global branch history table (BHT) 310*b*, and a global selector 310*c*. The prediction hardware is accessed through an instruction fetch address register (IFAR) 320, which has the address for the next instruction fetch. In one embodiment, an instruction cache 325 fetches a plurality of instructions referred to as a "fetch group".

The cache and prediction hardware are accessed at approximately the same time with the same address. If the prediction hardware has prediction information available for an instruction in the fetch group, that prediction is forwarded to ISU 350, which, in turn, issues instructions to units for execution. The prediction may be used to update IFAR 320 in conjunction with branch target calculation and branch target prediction hardware (such as a link register prediction stack and a count register cache). If no prediction information is available, but the instruction decoders find a branch instruction in the fetch group, a prediction is created for that fetch group, stored in the prediction hardware and forwarded to ISU 350.

A branch execution unit (BRU) 340 operates in response to instructions issued to it by ISU 350. BRU 340 has read access to a condition register (CR) file 360. Branch execution unit 340 further has access to information stored by the branch scan logic in a branch information queue (BIQ) 342, to determine the success of a branch prediction, and is operatively coupled to instruction fetch address register(s) (IFAR) 320 corresponding to the one or more threads supported by the microprocessor. In accordance with at least one embodiment, BIQ entries are associated with, and identified by an identifier, e.g., by a branch tag BTAG. When a branch associated with a BIQ entry is completed, it is so marked. BIQ entries are maintained in a queue, and the oldest queue entry (entries) is/are de-allocated sequentially when they are marked as containing information associated with a completed branch. BRU 340 is further operatively coupled to cause a predictor update when BRU 340 discovers a branch misprediction.

When the instruction is executed, BRU 340 detects if the prediction is wrong. If so, the prediction is to be updated. For this purpose, the processor in FIG. 3 also includes predictor update logic 330. Predictor update logic 330 is responsive to an update indication from branch execution unit 340 and configured to update array entries in one or more of the local BHT 310, global BHT 310*b*, and global selector 310*c*. The predictor hardware 310*a*, 310*b*, and 310*c* may have write ports distinct from the read ports used by the instruction fetch and prediction operation, or a single read/write port may be shared. Predictor update logic 330 may further be operatively coupled to a link stack 315*a* and a counter register stack 315*b*.

Referring now to condition register file (CRF) 360, CRF 360 is read-accessible by BRU 340 and can be written to by the execution units, including but not limited to, a fixed point unit (FXU) 365, a floating point unit (FPU) 375, and a vector multimedia extension unit (VMXU) 380. A condition register logic execution unit (CRL execution) 355 (also referred to as the CRU), and SPR handling logic have read and write access to condition register file (CRF) 360. CRU 355 performs logical operations on the condition registers stored in CRF file 360. FXU 365 is able to perform write updates to CRF 360.

Figure 4:
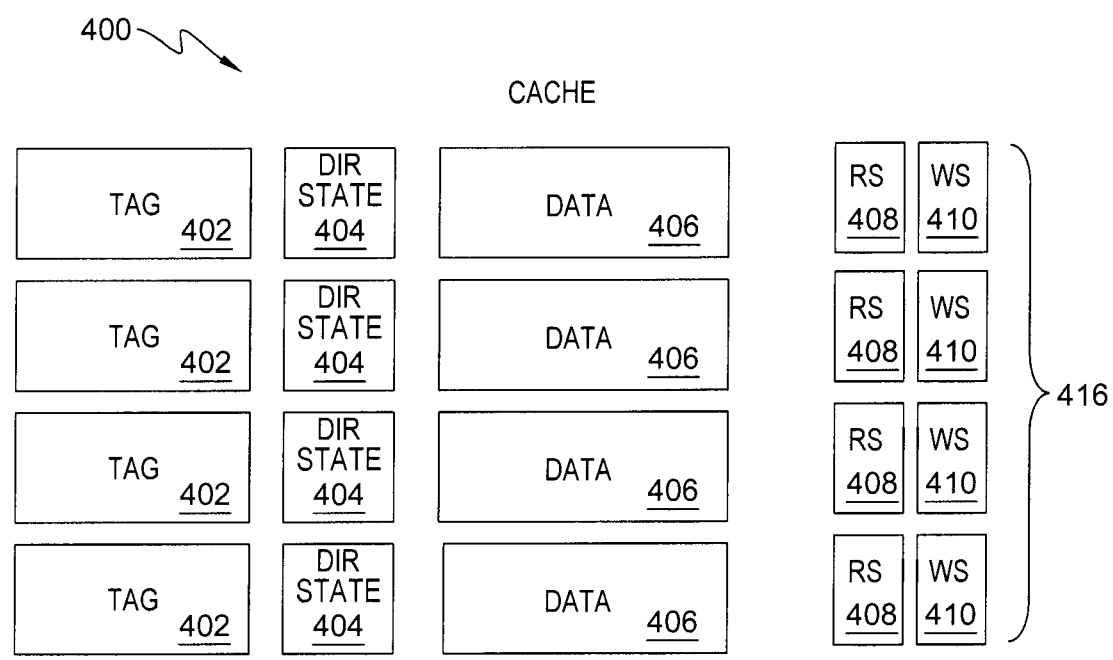
FIG. 4 depicts one example of a cache with an associated read and write set for each cache line of the cache.

Further details relating to the use of a cache are described with reference to FIGS. 2 and 4. In one example, L1 cache 240 (FIG. 2) has a transaction read (tx-read) field 248 and a transaction dirty (tx-dirty) field 252. Tx-read 248 corresponds to a read set (RS) 408 (FIG. 4), and Tx-dirty 252 corresponds to a write set (WS) 410. When an address is generated 236, it may be indicated that it is subject to a memory access, such as a load, that is being read for a transaction in a cache line that holds data 406. There may be an associated read bit for each cache line or a subset of bytes (i.e., subline) for each cache line. As such, there may be multiple bits of the read set where each bit corresponds to a subset of the plurality of bytes (i.e., subline) that makes up a cache line, which is shown as data 406. Therefore, when an address is accessed, load and store unit (LSU) 280 identifies the cache line by way of indexing and tag matching (i.e., tag field 402) to select a cache line corresponding to a memory load and for setting a read set bit 408 corresponding to the bytes that are being accessed by a specific memory load. Then, LSU 280 sets that bit 248 for that cache line to indicate that this cache line or a subset of bytes of the cache line is now part of that transaction's read (tx-read) set.

Similarly, when a write occurs, write set bits 410 (corresponding to tx-dirty bits 252) are being updated with the same mechanism to indicate a write within a transaction has occurred to a particular cache line, or subset of bytes within that cache line (subline) associated with the tx-dirty or transaction write set bits, and that the line (or subline) is part of the active transaction's write set. L1 tag 256 corresponds to field tag 402 associated with each cache line 416. In this example, 4 cache lines 416 are depicted for example purposes only. Each cache line 416 may be stored and associated with a different tag 402. Valid bit 244 is an example directory state and corresponds to field 404.

In accordance with an aspect of the present invention, transactions are enabled from multiple threads of a computing environment. As one example, the threads are hardware threads executing independently and concurrently on a shared processor. Each thread, in this example, executes at most one transaction at a time. Further, in accordance with an aspect of the present invention, multiple tracking sets (e.g., read and write sets) are provided per cache line, one for each thread (i.e., per transaction).

In a further embodiment, a thread may execute one or more transactions, and in such an embodiment, there may be multiple read/write sets per thread, per cache line, i.e., one read/write set per transaction per cache line.

In one example, multiple transactions of multiple threads are allowed to read the same data; the same transaction of a thread may read and write data; and if one transaction of one thread marks data as part of its write set, no other transaction of another thread may set read or write set indicators for that data.

Figure 5:
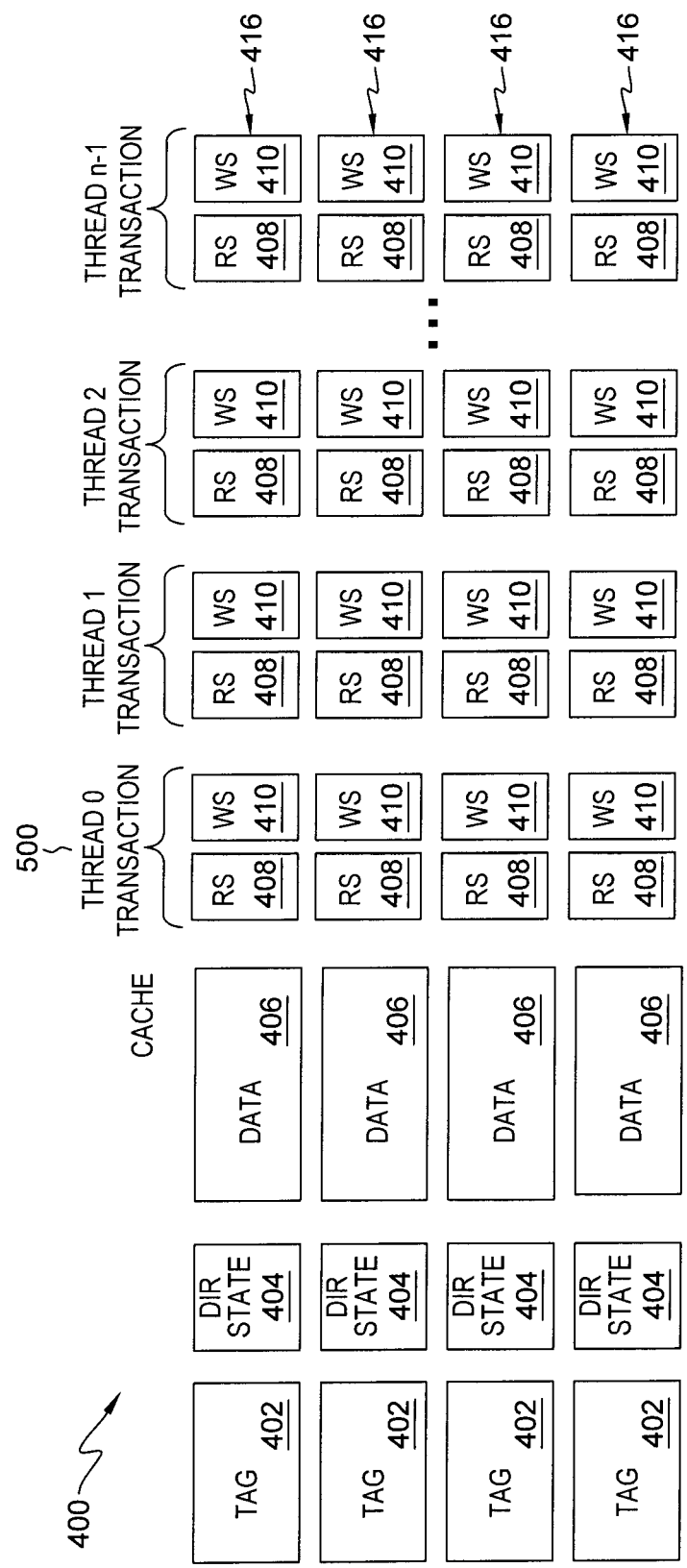
FIG. 5 depicts one example of a plurality of read and write sets for each cache line of the cache, in which each read and write set of the cache line is associated with a transaction.

One example of using tracking sets, such as read/write sets, per transaction per cache line is described with reference to FIG. 5. Again, in this example, there is one transaction per thread, and therefore, the read/write set is assigned per thread (or per transaction) per cache line. As one example, a cache line 416 may have one or more threads 500 associated therewith, and each thread 500 may be executing a transaction. Further, each thread, i.e., each transaction, has an associated read set 408 and write set 510 (collectively referred to herein as RS/WS or tracking set). Thus, each cache line may have a plurality of threads (or transactions) associated therewith, and each thread (or transaction) may have a corresponding RS/WS. Each read set may include one or more read indicators, and similarly, each write set may include one or more write indicators.

One embodiment of marking read and write indicators of read and write sets is described with reference to FIG. 6. In this example, threads (e.g., hardware threads) execute independently and concurrently on one or more processors and share the same cache. The logic of this figure describes processing of local accesses of the cache (e.g., accesses of threads on the same core or other cores that share the cache). If, however, remote accesses from other threads are received via, e.g., a protocol request on a processor bus, then they may be handled concurrently or in accordance with a priority scheme, in a conventional manner. This marking logic is performed by, for instance, a processor, and in one example, the load/store unit of the processor. Other implementations are also possible.

Figure 6:
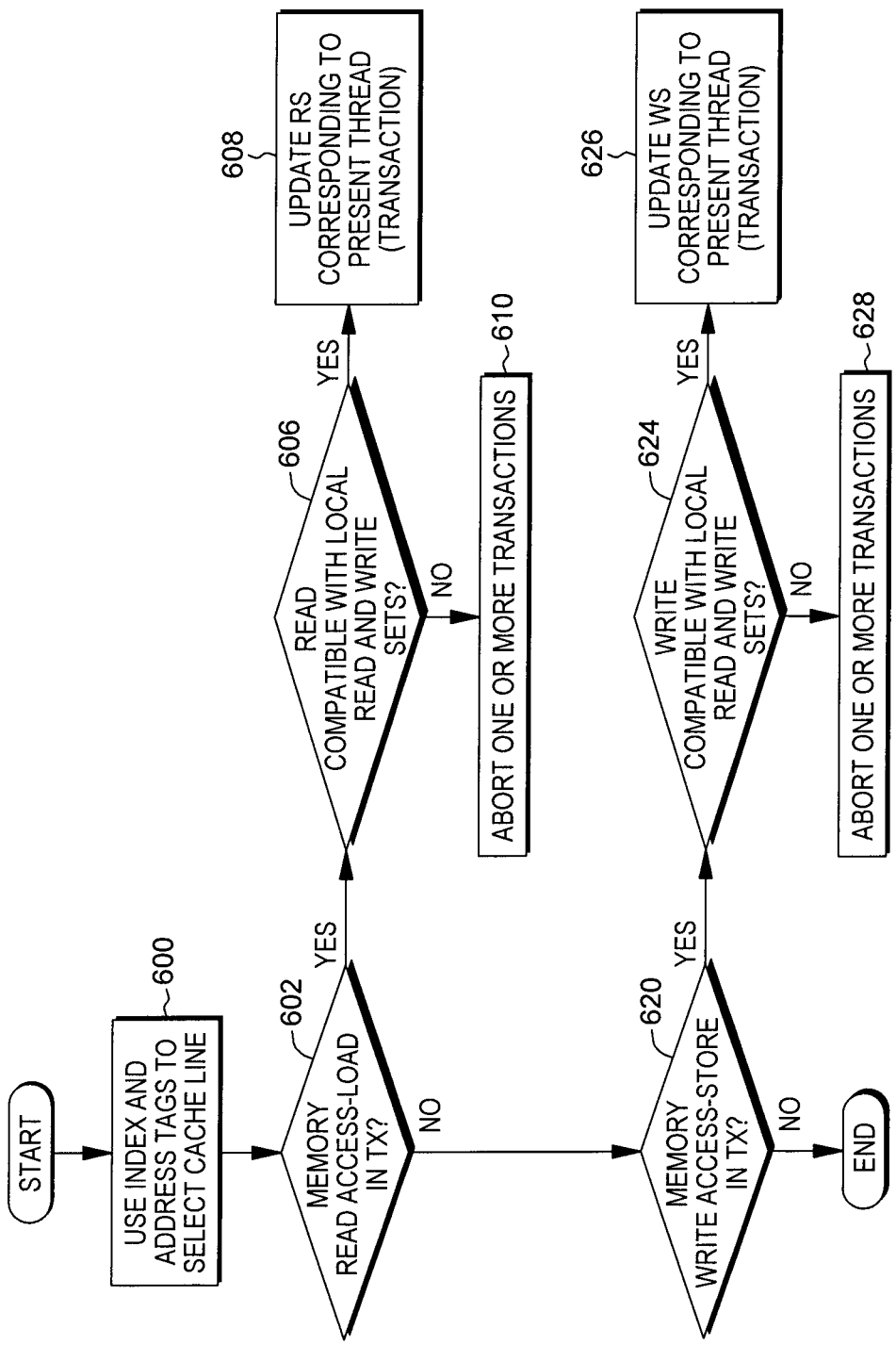
FIG. 6 depicts one embodiment of logic to set indicators of read and write sets, in accordance with an aspect of the present invention.

Referring to FIG. 6, initially, a cache line is selected using address tags and an index of the address obtained from the load or store instruction resulting in the marking processing, STEP 600. A determination is made as to whether the instruction is a load instruction that is part of a transaction (e.g., issued after a TBEGIN instruction), INQUIRY 602. If it is a load instruction within a transaction, then a determination is made as to whether the read is compatible with the local read and write sets of the cache (e.g., the read and write sets of the cache line to be accessed), INQUIRY 606. For instance, is this read allowed to be processed based on the rules (e.g., multiple transactions of multiple threads allowed to read the same data, but if one transaction of one thread marks the data as part of its write set, no other transaction (e.g., of another thread) may read or write the data). If the read is compatible, the read indicator of the read set of the cache line to be read and associated with the thread executing the transaction (or associated with the transaction) is marked (e.g., set to one), STEP 608.

However, if the read is incompatible, then one or more transactions are aborted, STEP 610. For example, if there are multiple transactions of multiple threads that are in an interference, then all of the transactions of all of the threads in the interference but one, in this example, are aborted. The decision as to the transaction not to be rolled back may be based on a metric, such as a priority metric in one example, e.g., which transaction has performed more work (earned value), is more important for the system, etc. Other metrics are also possible.

Returning to INQUIRY 602, if the instruction is not a load instruction that is part of a transaction, then a further determination is made as to whether the instruction is a store instruction that is part of a transaction, INQUIRY 620. If it is a store instruction that is part of a transaction, then a determination is made as to whether the current write request is compatible with the local read and write sets of the cache (e.g., the read and write sets of the cache line to be accessed), INQUIRY 624. For instance, is the write allowed to be processed based on the rules (e.g., multiple transactions of multiple threads allowed to read the same data, but if one transaction marks the data as part of its write set, no other transaction may read or write the data). If the write is compatible, the write indicator of the write set of the cache line to be written to and associated with the transaction issuing the request is marked (e.g., set to one), STEP 626. However, if the write is incompatible, then one or more transactions are aborted, STEP 628. As above, the transaction not to be rolled back may be selected based on a metric, such as a priority metric, as an example.

Further details regarding marking are described below. Reference is made to FIGS. 2, 4, 5 and 6. In one example, the processing of the indicators of the read and write sets is performed in LSU 280 (FIG. 2) in conjunction with the processing of load and store instructions. The process of marking is generally associated with the process of accessing the cache. Address calculation 236 divides the address provided by the load or store instruction into an index that selects one of multiple cache line groups that makes up an associativity set. Address tags 256, 402 (FIG. 4) are used to match and identify which of multiple memory addresses that have the same index correspond to which cache line 416 (FIGS. 4-5). As such, a cache line 416 is identified in a cache that corresponds to a specific address. Therefore, at STEP 600 (FIG. 6), the index and the address tags are used to select a cache line. In particular, in one example, the index and address tags are used to identify a cache line 416 within a cache 240 to read memory data and update read sets 408 and to write memory data (optionally in conjunction with a store queue 260) and update write sets 410 that are associated with a cache line 416.

Responsive to a cache miss, a cache reload is performed before processing resumes with STEP 600 to select a cache line. Then, at INQUIRY 602, it is determined whether the operation being performed corresponds to a load operation, as part of a transaction. If at INQUIRY 602, it is determined that the operation being performed corresponds to a load operation, such as a memory load instruction or a read operand of a compute instruction that uses memory operands (which would also qualify as a load), then processing continues at INQUIRY 606.

If, however, at INQUIRY 602, it is determined that the operation being performed does not correspond to a load operation, then at INQUIRY 620, it is determined whether the operation being performed corresponds to a memory store or a compute operation that performs a store to memory as one of the compute operation's write operands that receive a result of the compute operation. If at INQUIRY 620 it is determined that the operation being performed corresponds to a store operation, then processing continues at INQUIRY 624. Otherwise, processing of this logic completes.

In one embodiment, other steps typically associated with the loading and storing of memory operands, such as the current methods of microprocessor 300 (FIG. 3), are performed in conjunction with performing the steps previously described in FIG. 6. The current methods may include selecting bytes from a cache line and returning bytes from the cache line to microprocessor core 300, aligning, rotating or otherwise preparing for processing those bytes and making them available to the processor or conversely responsive to a store operation to update the store data into the store queue, and further, updating the data into the cache line of the cache that is associated with the address to which the data is to be written.

Another embodiment of marking the read and write indicators of the read and write sets is described with reference to FIG. 7. In this example, threads execute independently and concurrently on one or more processors sharing a cache. This logic describes processing of local accesses of the cache (e.g., accesses of threads on the same core or other cores that share the cache). If, however, remote accesses from other threads are received via, e.g., a protocol request on a processor bus, then they may be handled concurrently or in accordance with a priority scheme, in a conventional manner. This marking logic is performed by, for instance, a processor, and in one example, the load/store unit of the processor. Other implementations are also possible.

Figure 7:
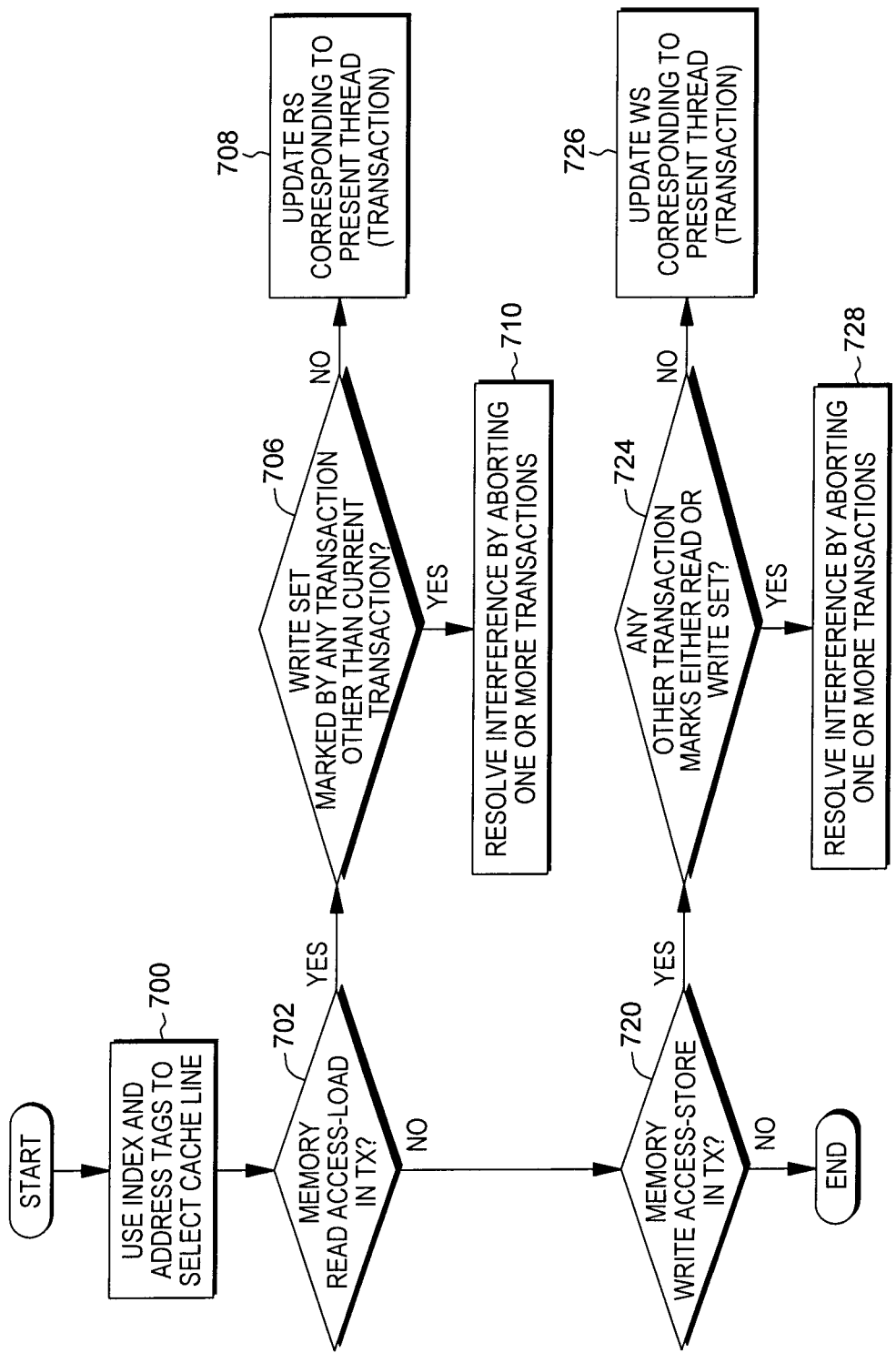
FIG. 7 depicts another embodiment of logic to set indicators of read and write sets, in accordance with an aspect of the present invention.

Referring to FIG. 7, initially, a cache line is selected using address tags and an index of the address obtained from the load or store instruction resulting in the marking processing, STEP 700. A determination is made as to whether the instruction is a load instruction that is part of a transaction (e.g., issued after a TBEGIN instruction), INQUIRY 702. If it is a load instruction within a transaction, then a determination is made as to whether a write set of the cache line being accessed is marked by a transaction of any thread other than the transaction of the current thread, INQUIRY 706. If a write set is not marked by a transaction other than the transaction of the current thread, then a read indicator of the read set associated with the transaction issuing the request and of the cache line being accessed is marked (e.g., set to one), STEP 708.

However, if a write set is marked by a transaction of a thread other than the transaction of the current thread, INQUIRY 706, then there is an interference, and the interference is resolved by, for instance, aborting one or more transactions of one or more threads, STEP 710. As described above, the transaction selected not to be aborted may be selected based on a metric, such as a priority metric in one example, e.g., which transaction has performed more work (earned value), is more important for the system, etc. Other metrics may also be used.

Returning to INQUIRY 702, if the instruction is not a load instruction that is part of a transaction, then a further determination is made as to whether the instruction is a store instruction that is part of a transaction, INQUIRY 720. If it is a store instruction that is part of a transaction, then a determination is made as to whether a read set or a write set (i.e., a tracking set) of this cache line is marked by a transaction of a thread other than the transaction of the current thread, INQUIRY 724. If a read set or a write set is not marked by a transaction other than a transaction of the current thread, then a write indicator of the write set associated with the current transaction and of this cache line is marked (e.g., set to one), STEP 726. However, if a read set or a write set is marked by a transaction other than the transaction of the current thread, INQUIRY 724, then there is an interference, and the interference is resolved by, for instance, aborting one or more transactions of one or more threads, STEP 728. Again, the transaction selected not to be aborted may be selected based on a metric, such as a priority metric, as an example.

In a further aspect, there are data dependent threads, in which a transaction of one thread reads the data written by a transaction of another thread. In such an aspect, an order is identified between the transactions, either implicitly, or explicitly by the program. The order identifies independent transactions to execute in parallel, and if there are data dependencies between the transactions, then the data may be forwarded when possible. An order is established between transactions of different threads. As long as the transactions adhere to the same order, they are allowed to proceed with processing. For example, if there are two transactions, T0 and T1, and T1 writes A and T0 reads A, there is a dependency of T0 on T1, since T1 is to write A before T0 can read A. Many other examples exist.

In one embodiment, there are general ordering constraints. For instance:

A transaction of a thread is to be ended (e.g., aborted), if it saw the state of another transaction of another thread that was aborted;

On an abort of a transaction of thread T, other transactions of other threads are to be ended (e.g., aborted), if they read from or may have read from thread T. This may be determined from actual assigned age order or an established dependence; and/or A transaction of a thread is not to commit until it is no longer dependent on another thread's transaction (this thread's transaction is to be able to be aborted if another thread's transaction is aborted).

Dependency may be based on one or more user specified relationships, and/or discovered, inferred or otherwise determined based on data dependencies.

Further, threads may be ordered based on a selected criteria, such as age or another selected criteria. Age refers to, for example, whether one transaction of a thread is younger than another transaction of another thread. A transaction can be younger than another transaction or defined to be younger based on processing. Ordering may be used to optimize processing in determining whether a transaction may proceed with processing, including, for instance, accessing the requested cache line and updating the appropriate read/write set.

One embodiment of marking read and write indicators of read and write sets based on ordering is described with reference to FIG. 8. This logic describes processing of local accesses of the cache (e.g., accesses of threads on the same core or other cores that share the cache). If, however, remote accesses from other threads are received via, e.g., a protocol request on a processor bus, then they may be handled concurrently or in accordance with a priority scheme, in a conventional manner. This marking logic is performed by, for instance, a processor, and in one example, the load/store unit of the processor. The load/store unit may further use thread ordering logic 290. Other implementations are also possible.

Figure 8:
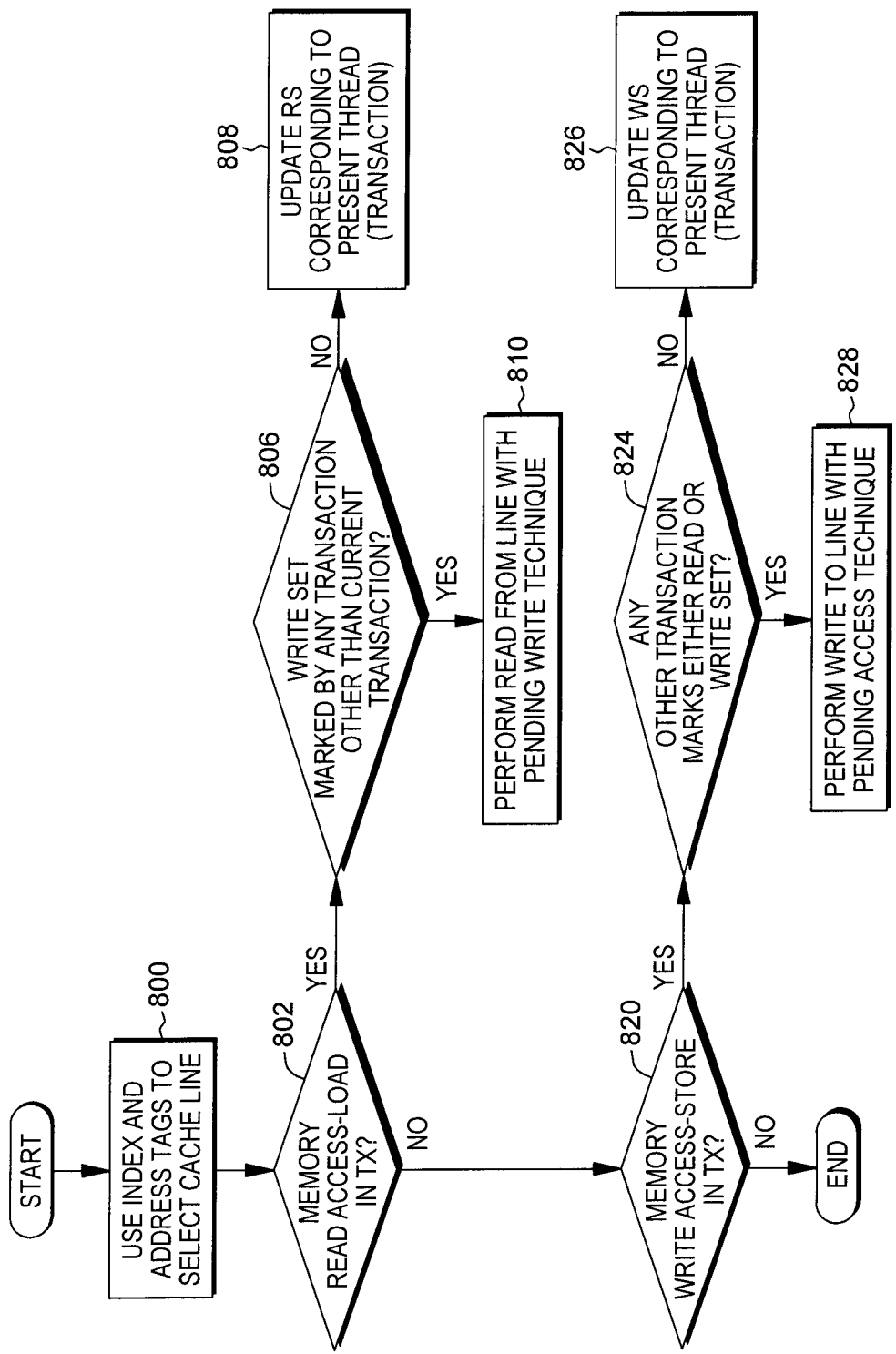
FIG. 8 depicts yet another embodiment of logic to set indicators of read and write sets, in accordance with an aspect of the present invention.

Referring to FIG. 8, initially, a cache line is selected using address tags and an index of the address obtained from the load or store instruction resulting in the marking, STEP 800. A determination is made as to whether the instruction is a load instruction that is part of a transaction (e.g., issued after a TBEGIN instruction), INQUIRY 802. If it is a load instruction within a transaction, then a determination is made as to whether a write set for the cache line being accessed is marked by a transaction of a thread other than the transaction of the current thread, INQUIRY 806. If a write set is not marked by a transaction other than the transaction of the current thread, then a read indicator of the read set associated with the current transaction and of this cache line is marked (e.g., set to one), STEP 808. However, if a write set is marked by a transaction other than the transaction of the current thread, then the read is performed from the cache line with a pending write technique, STEP 810, as described further below with reference to FIG. 9.

Returning to INQUIRY 802, if the instruction is not a load instruction that is part of a transaction, then a further determination is made as to whether the instruction is a store instruction that is part of a transaction, INQUIRY 820. If it is a store instruction that is part of a transaction, then a determination is made as to whether a read set or a write set for the requested cache line is marked by a transaction of any thread other than the current thread, INQUIRY 824. If a read set or a write set is not marked by a transaction other than the current transaction, then a write indicator of the write set associated with the thread executing the transaction (or associated with the transaction) and of this cache line is marked (e.g., set to one), STEP 826. However, if a read set or a write set is marked by a transaction other than the transaction of the current thread, then a write is performed to the cache line with a pending access technique, STEP 828, as described further below with reference to FIG. 10.

Further details regarding reading the cache line with a pending write technique are described with reference to FIG. 9. This logic (referred to herein as thread ordering logic 290) is invoked, for instance, if there is a write to the cache line from a transaction other than the transaction performing the read access.

Figure 9:
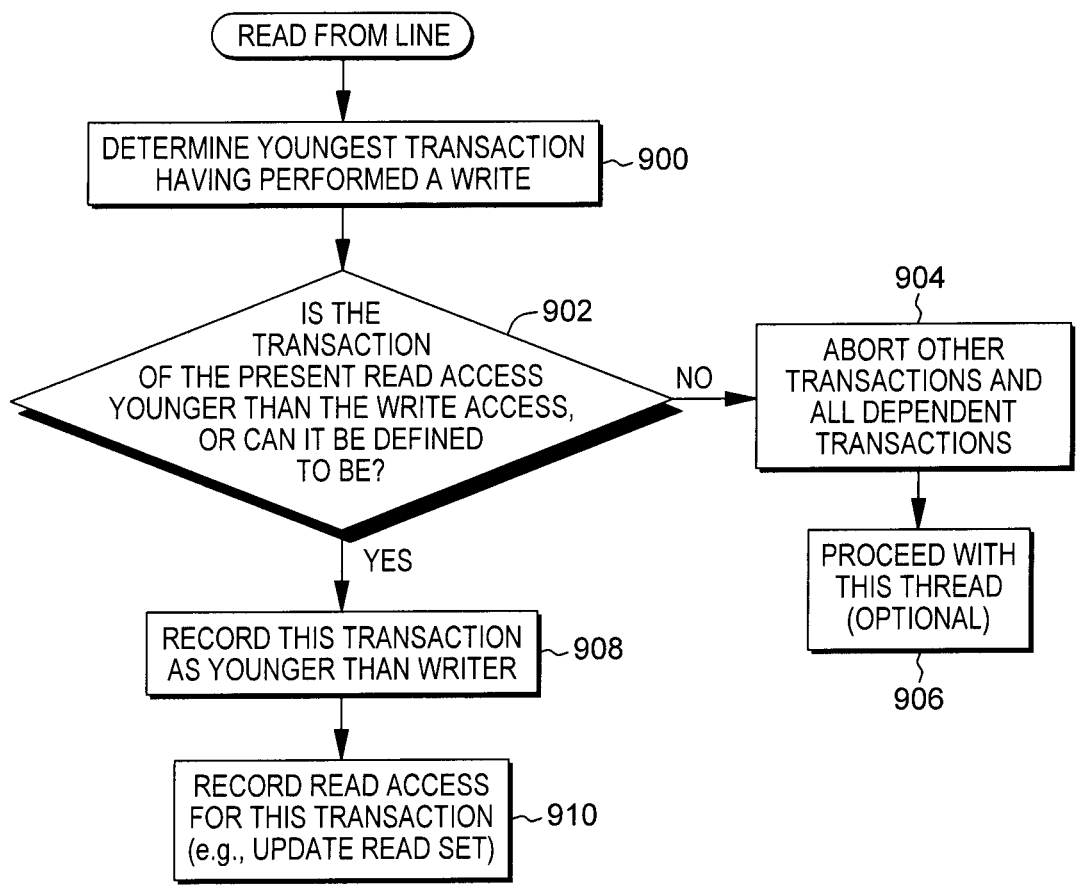
FIG. 9 depicts one embodiment of logic to read from a cache line, in accordance with an aspect of the present invention.

Referring to FIG. 9, initially, a determination is made as to the youngest transaction having performed a write (e.g., to the cache line to be accessed), STEP 900. In order to allow concurrent accesses to data between multiple transactions, an order between transactions is defined. In accordance with this order, an order relationship is imposed that is to be observed by all accesses for which a possible ordering can be observed. When a pair of accesses violates the ordering, then a violation occurs. These relationships are referred to as older/younger, in which when one transaction performs an access after another transaction, it is younger. Examples of orderings include read and write—if the writer is older, the younger transaction reads what is written by the older transaction. Similarly, for two writes—the write of the younger transaction is to occur after the write of the older transaction, and is to be what is left visible at the end of the transaction. Other examples may also exist.

In various embodiments, the younger relationship may be established, as follows. In one embodiment, the relationship is established by an application technique, in which the programmer indicates which transactions to treat as younger or older. In other embodiments, the system may assign an age. In one embodiment, age is assigned in sequential order, i.e., a first transaction started is older than a second transaction started. In a further embodiment, a flexible assignment of age starts with no defined relationship, but defines them in a sequence to minimize the need for aborting a transaction. Thus, for example, when there are two transactions in which a second transaction reads data written by a first transaction, or a transaction overwrites data written by a first transaction, this can be accommodated by assigning the younger transaction of a thread a younger property. Once the order is defined, it is to be observed.

Continuing with FIG. 9, a determination is made as to whether the transaction of the present read access is determined to be younger than the write access of the youngest transaction having performed a write, INQUIRY 902. In one example, the current transaction is determined to be younger than the youngest transaction having performed a write, if the transaction of the thread of the present read access is younger than the write access of the youngest transaction to perform a write, or the transaction of the present read access can be defined to be younger than the transaction of any write access to the present cache line. A transaction may be determined to be younger if a record indicates that it is younger, or, alternatively, can be defined to be younger than a write access if no record exists that precludes it from being younger either due to its direct or indirect relationship to any transaction of the write access.

If the transaction of the present read access is not determined to be younger than the write access of the youngest transaction, then selected transactions of other threads (e.g., younger transactions), and any dependent transactions are aborted, STEP 904. Further, in one embodiment, processing continues with the current thread (e.g., transaction), STEP 906. In other embodiments, processing may not continue with the current thread.

Returning to INQUIRY 902, if the transaction of the present read access is determined to be younger than the write access, then the transaction of the present read access is recorded as being younger than the writer, STEP 908. For instance, it is recorded in a memory device. Additionally, the read access is recorded for this transaction, STEP 910. For instance, an indicator in the read set for this transaction in this cache line is set (e.g., to one).

Further details regarding performing a write to a cache line with a pending access technique are described with reference to FIG. 10. This logic (referred to as thread ordering logic 290) is invoked if there is a write or a read of the cache line from a transaction other than the transaction of the thread performing the write access.

Figure 10:
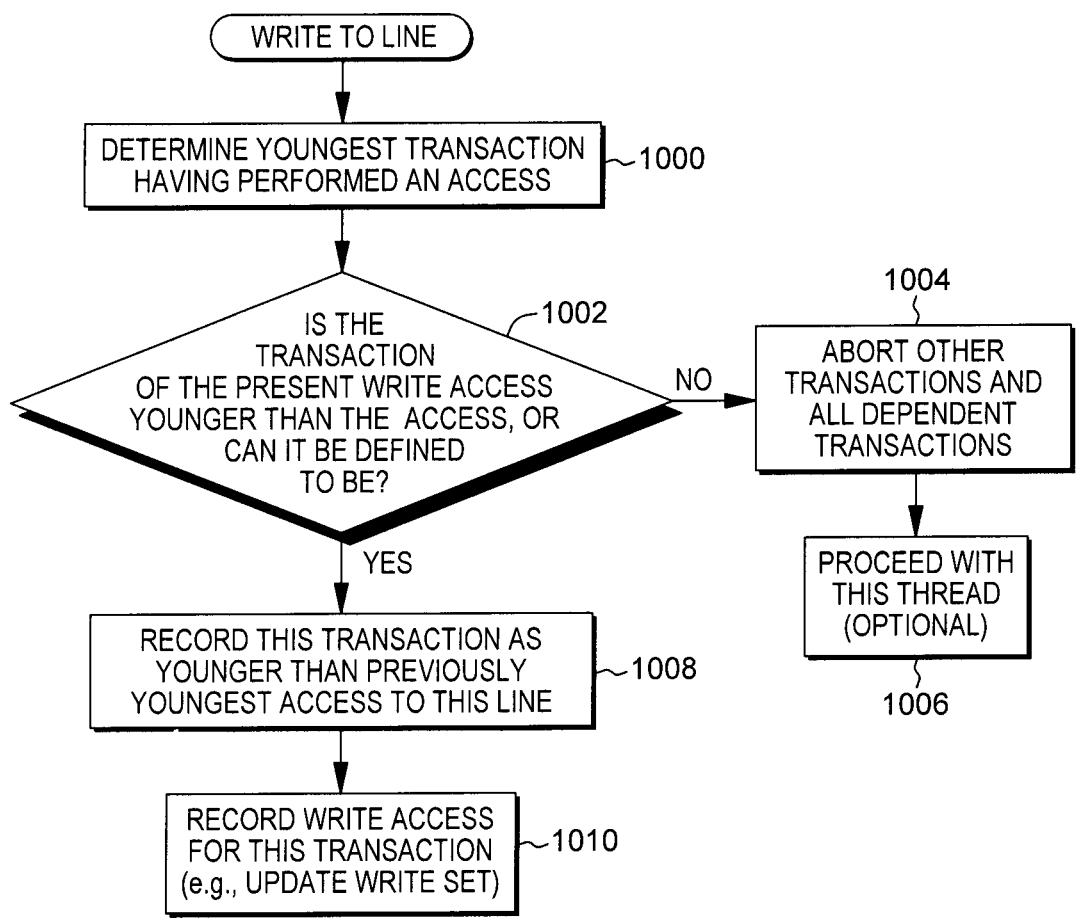
FIG. 10 depicts one embodiment of logic to write to a cache line, in accordance with an aspect of the present invention.

Referring to FIG. 10, initially, a determination is made as to the youngest transaction having performed an access (e.g., read or write), STEP 1000, as described above. Further, a determination is made as to whether the transaction of the present write access is determined to be younger than the access of the youngest transaction having performed the access, INQUIRY 1002. That is, in one example, the current transaction is determined to be younger than the youngest transaction having performed the access, if the transaction of the present write access is younger than the access of the youngest transaction to perform an access, or the transaction of the present write access can be defined to be younger than the youngest transaction having performed the access. If not, then selected transactions of other threads (e.g., younger transactions), and any dependent transaction are aborted, STEP 1004. Further, in one embodiment, processing continues with the current thread (e.g., transaction), STEP 1006. In other embodiments, processing may not continue with the current thread.

Returning to INQUIRY 1002, if the transaction of the present write access is determined to be younger, then the transaction of the present write access is recorded as being younger than the previously youngest access to this cache line, STEP 1008. Additionally, the write access is recorded for this transaction, STEP 1010. For instance, an indicator in the write set for this transaction in this cache line is set (e.g., set to one).

Described herein are aspects of updating tracking sets for threads of a multithreaded environment. As one example, each thread (i.e., each transaction) of each cache line has its own tracking set assigned thereto.

Figure 11A:
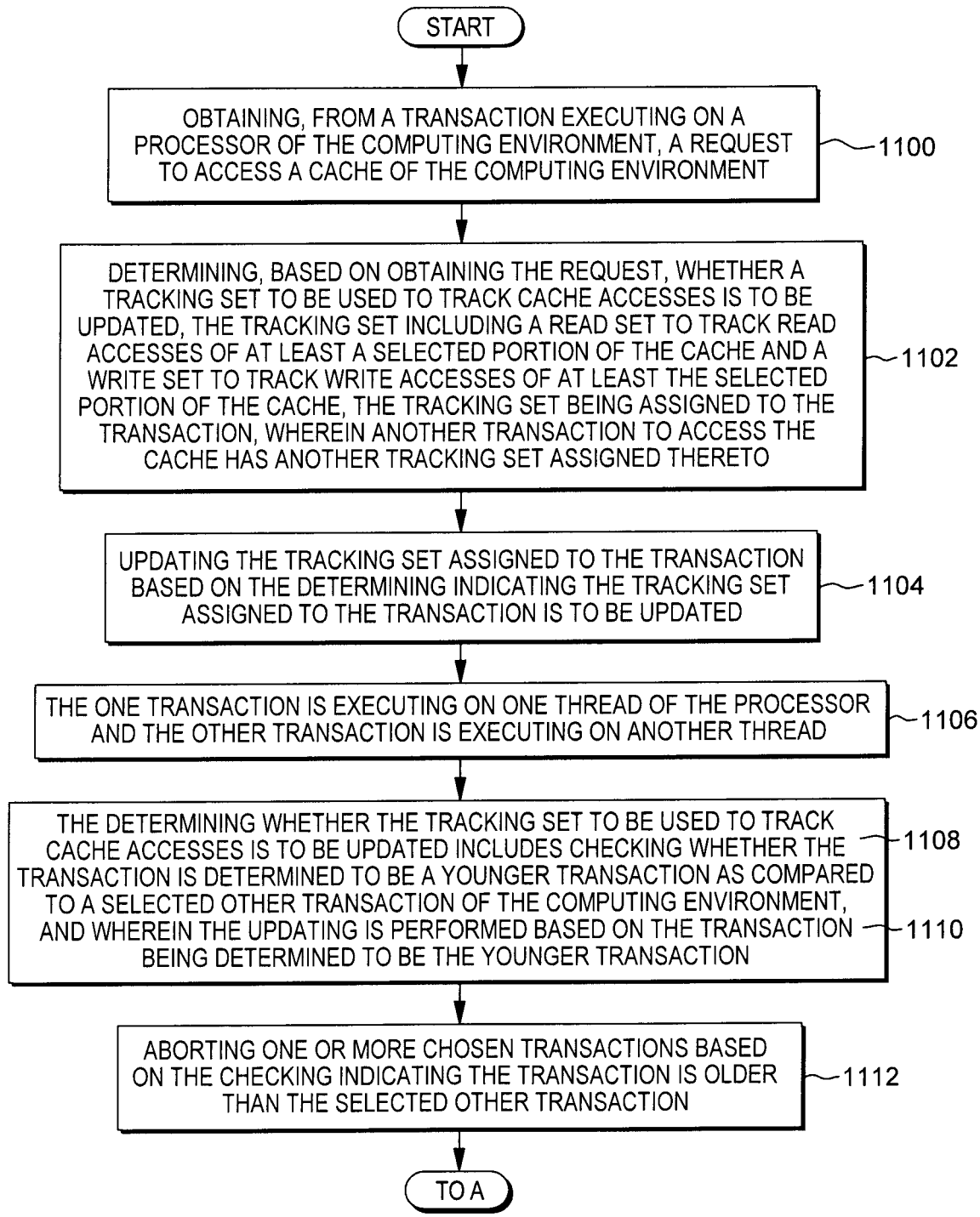
FIGS. 11A-11C depict one embodiment of logic to facilitate processing, in accordance with an aspect of the present invention.

Further details relating to facilitating processing by using tracking sets are described with reference to FIGS. 11A-11C. Referring initially to FIG. 11A, a request to access a cache of the computing environment is obtained from a transaction executing on a processor of the computing environment, STEP 1100. Based on obtaining the request, a determination is made as to whether a tracking set to be used to track cache accesses is to be updated, STEP 1102. The tracking set includes a read set to track read accesses of at least a selected portion of the cache and a write set to track write accesses of at least the selected portion of the cache. The tracking set is assigned to the transaction, and another transaction to access the cache would have another tracking set assigned thereto.

The tracking set assigned to the transaction is updated, based on the determining indicating the tracking set assigned to the transaction is to be updated, STEP 1104.

In one embodiment, the one transaction is executing on one thread of the processor and the other transaction is executing on another thread (e.g., of the processor or another processor), STEP 1106.

As one example, the determining whether the tracking set to be used to track cache accesses is to be updated includes checking whether the transaction is determined to be a younger transaction as compared to a selected other transaction of the computing environment, STEP 1108. The updating is performed based on the transaction being determined to be the younger transaction, STEP 1110.

Further, in one aspect, one or more chosen transactions are aborted, based on the checking indicating the transaction is older than the selected other transaction, STEP 1112.

Figure 11B:
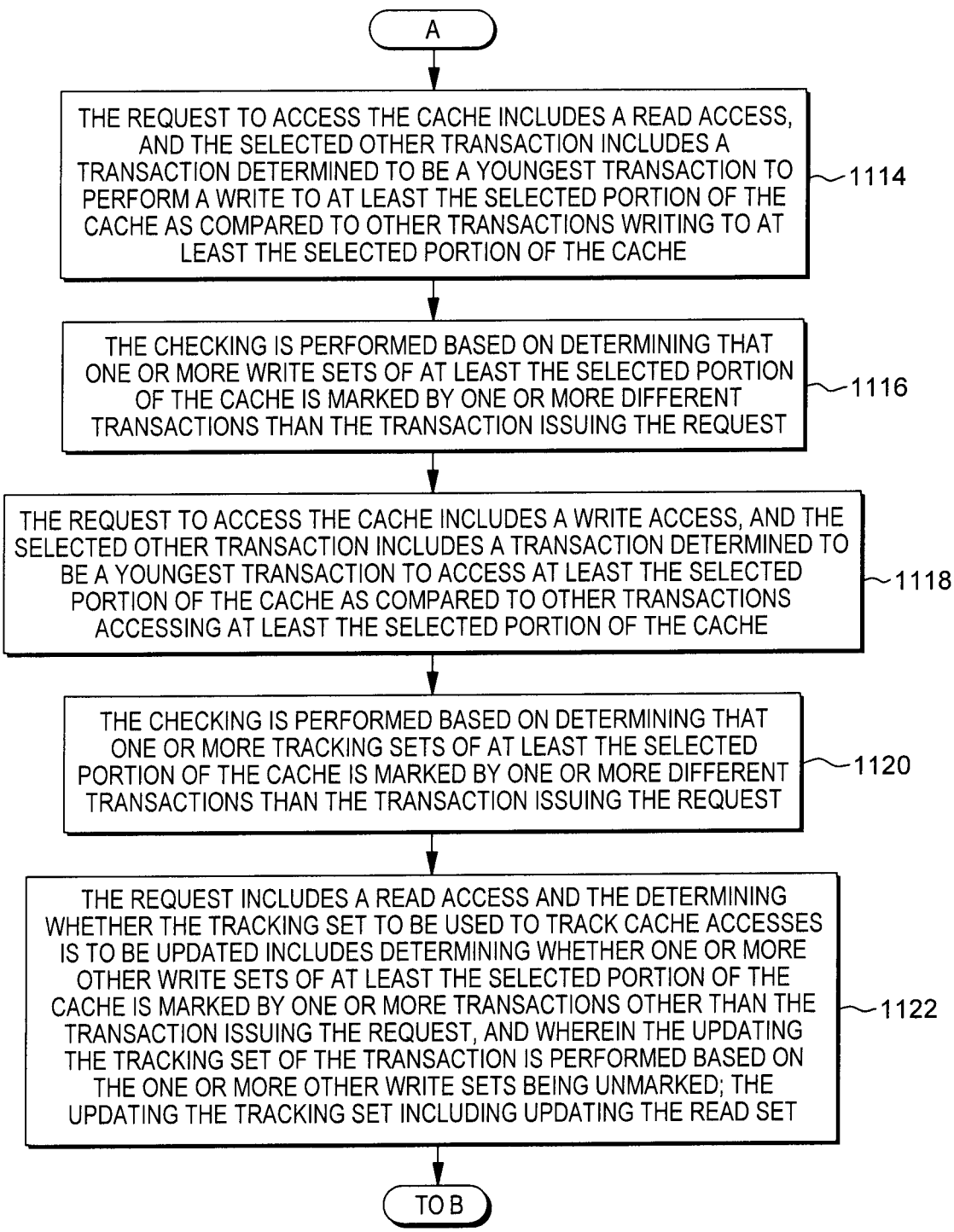

In one embodiment, the request to access the cache includes a read access, and the selected other transaction includes a transaction determined to be a youngest transaction to perform a write to at least the selected portion of the cache as compared to other transactions writing to at least the selected portion of the cache, STEP 1114 (FIG. 11B). As one example, the checking is performed based on determining that one or more write sets of at least the selected portion of the cache is marked by one or more different transactions than the transaction issuing the request, STEP 1116.

In one embodiment, the request to access the cache includes a write access, and the selected other transaction includes a transaction determined to be a youngest transaction to access at least the selected portion of the cache as compared to other transactions accessing at least the selected portion of the cache, STEP 1118. As one example, the checking is performed based on determining that one or more tracking sets of at least the selected portion of the cache is marked by one or more different transactions than the transaction issuing the request, STEP 1120.

In one example, the request includes a read access and the determining whether the tracking set to be used to track cache accesses is to be updated includes determining whether one or more other write sets of at least the selected portion of the cache is marked by one or more other transactions than the transaction issuing the request, and wherein the updating the tracking set of the transaction is performed based on the one or more other write sets being unmarked; the updating the tracking set including updating the read set, STEP 1122.

Figure 11C:
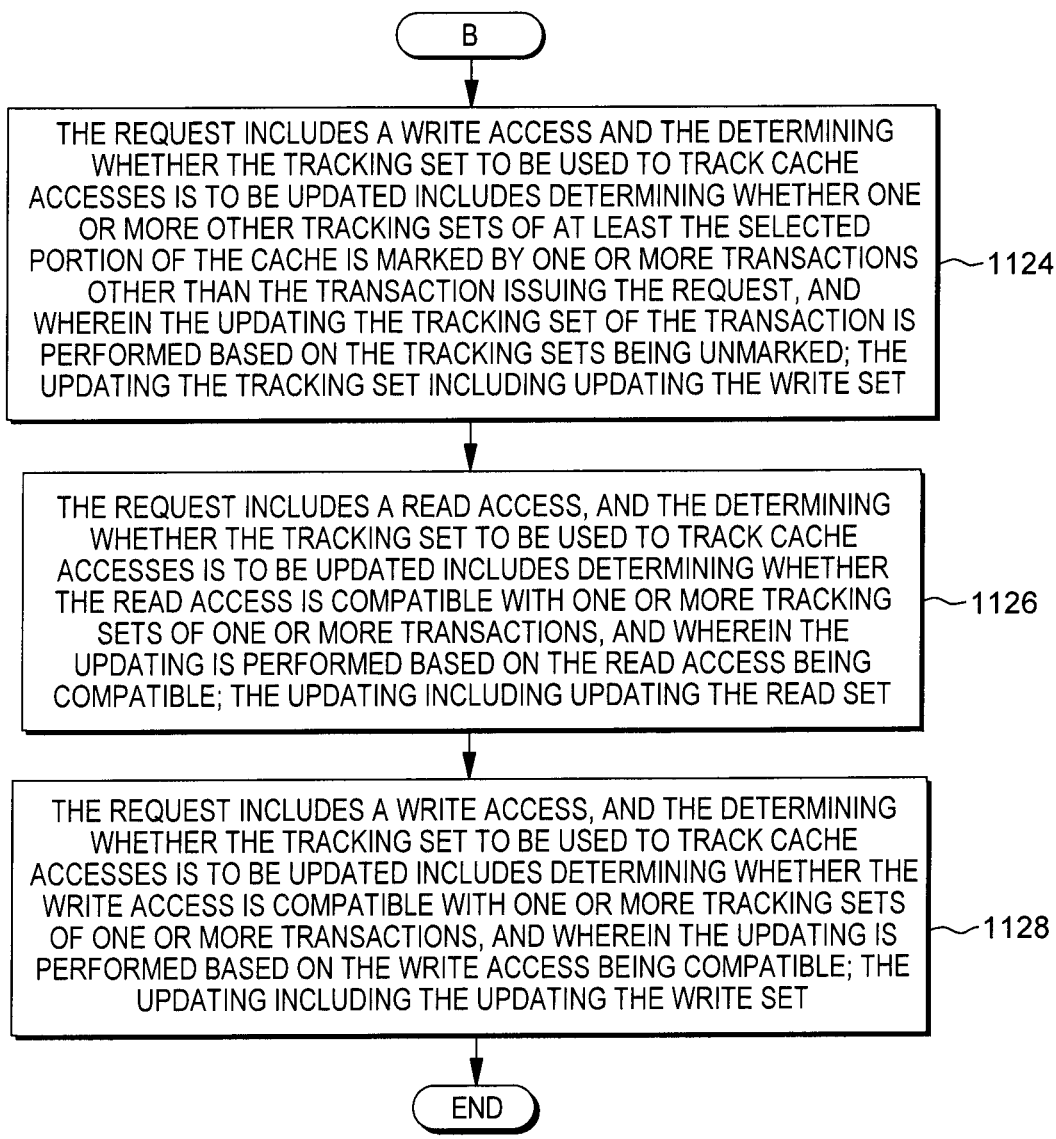

In a further example, the request includes a write access and the determining whether the tracking set to be used to track cache accesses is to be updated includes determining whether one or more other tracking sets of at least the selected portion of the cache is marked by one or more other transactions than the transaction issuing the request, and wherein the updating the tracking set of the transaction is performed based on the one or more tracking sets being unmarked; the updating the tracking set including updating the write set, STEP 1124 (FIG. 11C).

Further, in another example, the request includes a read access, and the determining whether the tracking set to be used to track cache accesses is to be updated includes determining whether the read access is compatible with one or more tracking sets of one or more transactions, and wherein the updating is performed based on the read access being compatible; the updating including updating the read set, STEP 1126.

Yet, in a further example, the request includes a write access, and the determining whether the tracking set to be used to track cache accesses is to be updated includes determining whether the write access is compatible with one or more tracking sets of one or more transactions, and wherein the updating is performed based on the write access being compatible; the updating including updating the write set, STEP 1128.

As described above, read or write indicators of read or write sets, respectively, may be set. In one embodiment, multiple indicators (e.g., bits) may represent separate portions (sublines) of the cache line, and in such an embodiment, one or more indicators of the sublines to be read/written are set.

In one embodiment, a cache line is only in one thread's read set or in one thread's write set, i.e., the plurality of bits corresponding to read sets for the plurality of threads has the "one hot" property, i.e., only one bit is set. Similarly, the plurality of bits corresponding to a thread's write set has the one hot property. In an alternate embodiment, each line has associated with it an entry indicating which thread has accessed the line for read or write.

When a read or write is performed, a check is made at, e.g., request time, to determine if a conflict exists. A conflict exists if another transaction has previously read or written the same cache line. In this case, an interference is recorded, and one transaction associated with one of the threads is rolled back.

In another embodiment, a cache line can be in multiple read sets, but only one write set. In such an embodiment, the plurality of bits corresponding to read sets for the plurality of threads does not have the "one hot" property, i.e., multiple bits can be set. However, the plurality of bits corresponding to a thread's write set has the one hot property. In an alternate embodiment, each line has associated with it an entry indicating which thread has accessed the line for write.

When an interference is detected, one or more transactions can be rolled back. An interference is detected when a write occurs to a line that has been read by another transaction, but not if the line is in the read set of only the present transaction's thread.

In yet a further embodiment, sharing of cache lines for write access is supported within threads sharing the same cache—this can be accomplished by assigning a distinct plurality of read and write bits for all threads to subsections of each line.

When an interference is detected by a non-local thread (i.e., from a remote request, when bits are only allocated for local threads), interference exists between local accesses and the remote thread with its remote request. In one embodiment, when an interference exists, all local transactions that are indicated as associated to the line subject to the interference are rolled back (in at least one execution scenario). If an interference test performs prioritization, in at least one check, the highest prioritization metric (e.g., thread priority number of remaining instructions, earned value or other) of all local threads associated with the line subject to interference is used.

In another aspect, a request from a local thread's transaction is received. A compatible read request is indicated. A compatible write request is indicated. If an incompatible read or write request is received, a plurality of transactions associated with the interfered line is rolled back. In one embodiment, a prioritization is performed, where the highest priority thread (e.g., transaction) of the preexisting users is compared to the priority of the user.

In one embodiment, dependence is allowed. One thread may be dependent on another thread. This can be accomplished if a transaction of a younger thread T2 can read from an older thread T1's write set. When a transaction of an older thread is rolled back, a transaction of a younger thread is rolled back. A transaction of an older thread reading form a younger thread's write set represents an interference.

In one embodiment, older and younger relationships are assigned dynamically, when a first thread's write set is being read by a transaction of a second thread. In another embodiment, this is determined a priori, e.g., by programmer intervention identifying an older and a younger thread. Other implementations exist.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 12:
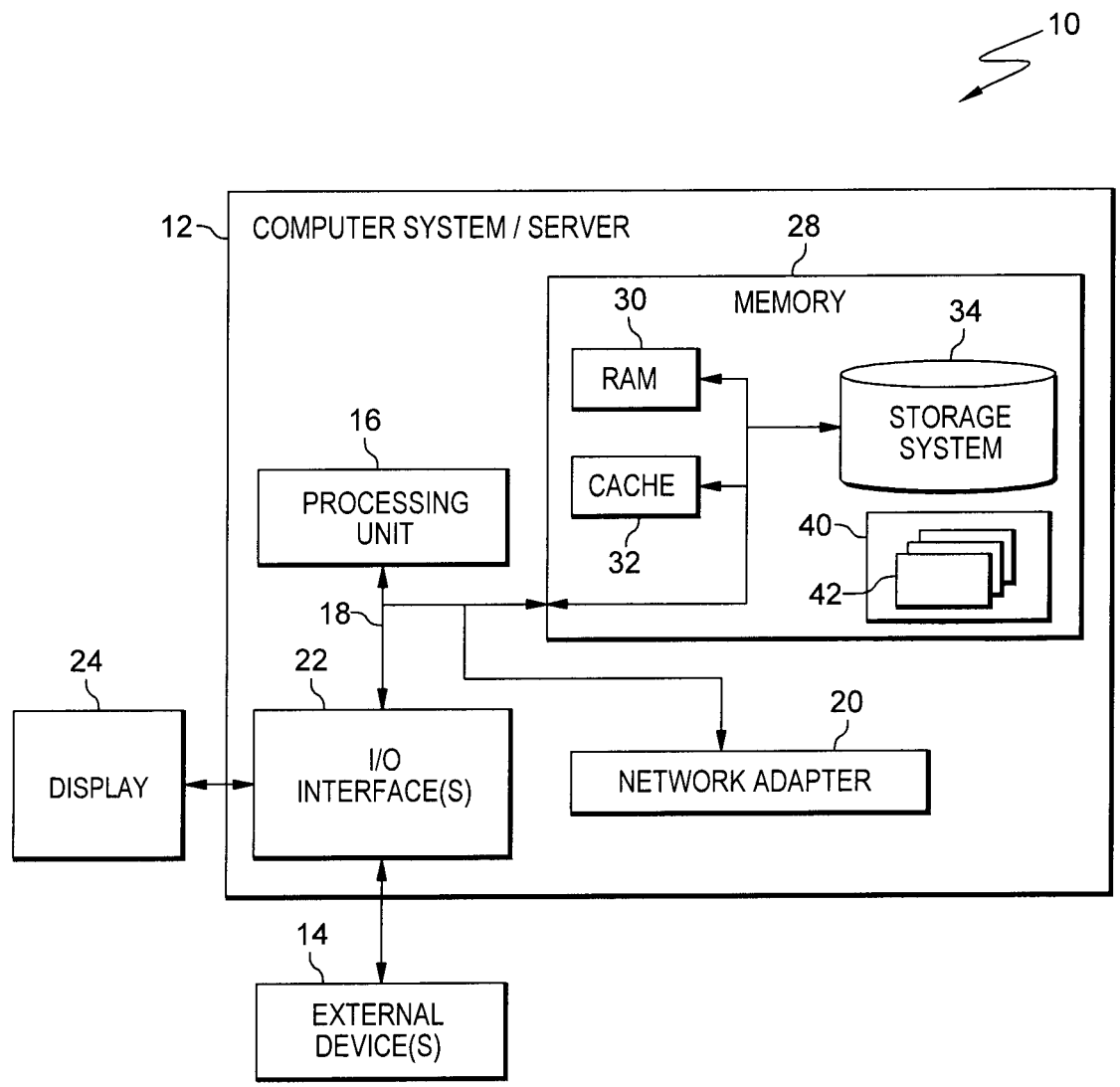
FIG. 12 depicts one embodiment of a cloud computing node.

Referring now to FIG. 12, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 13:
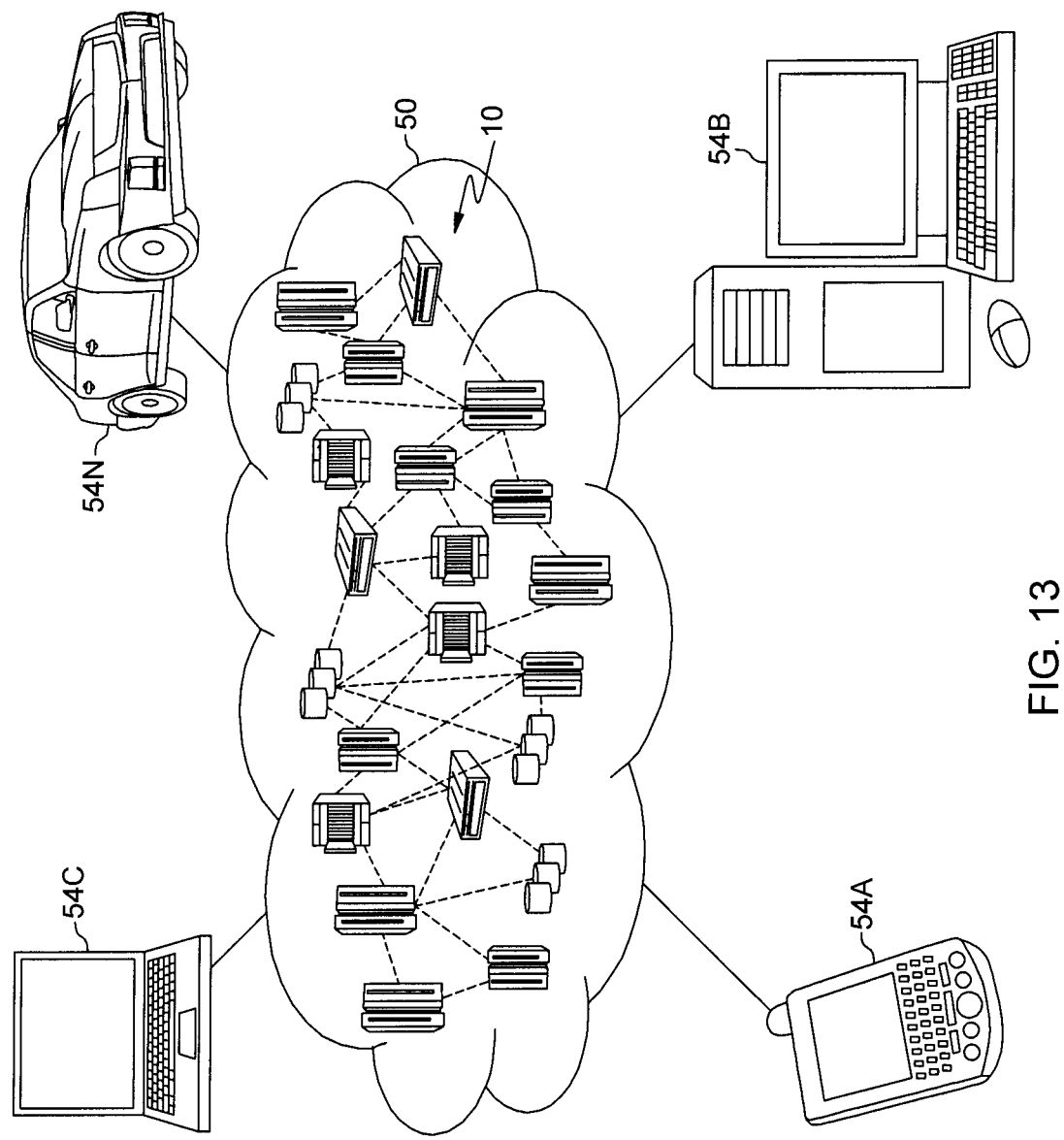
FIG. 13 depicts one embodiment of a cloud computing environment.

Referring now to FIG. 13, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Figure 14:
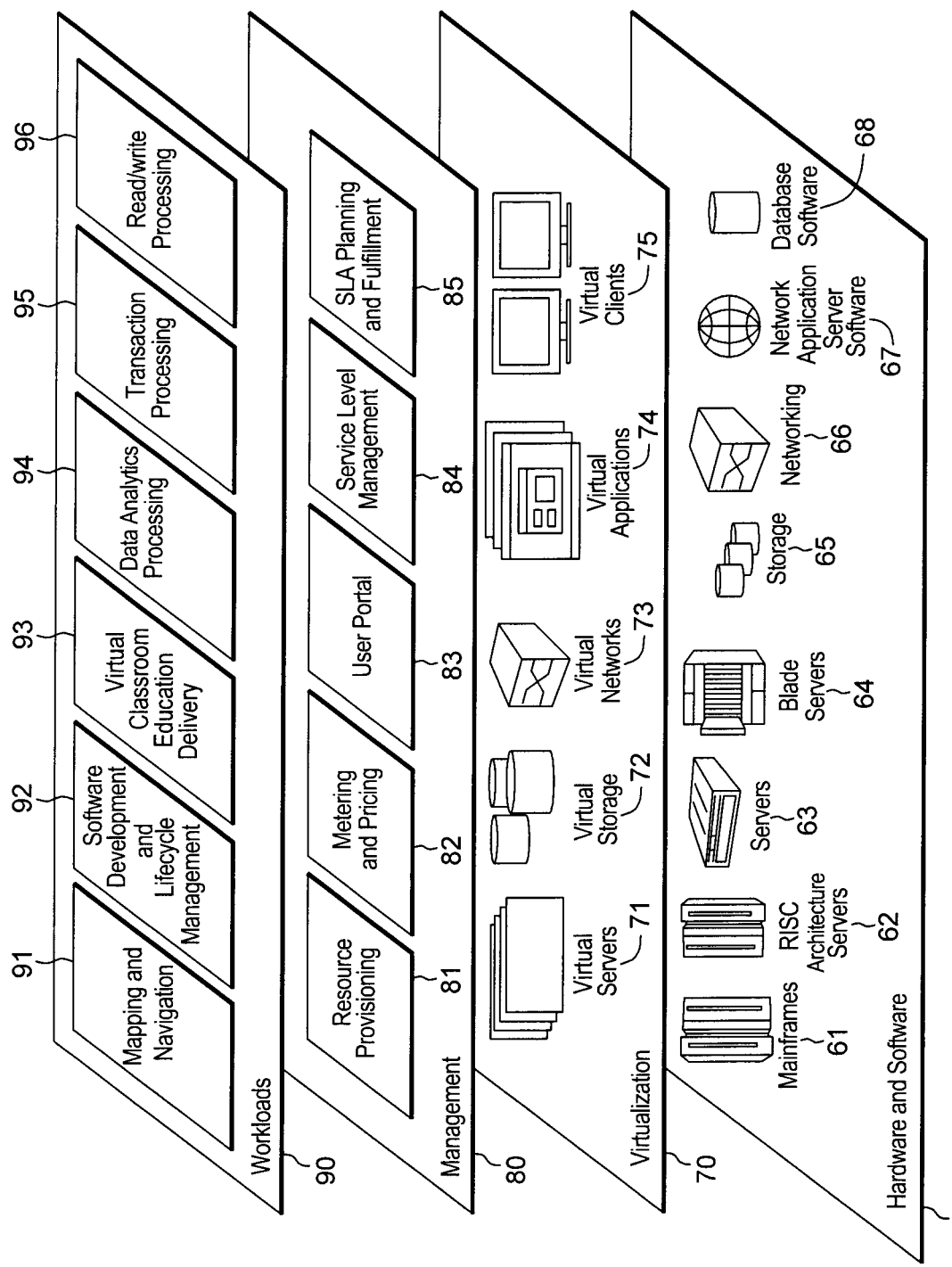
FIG. 14 depicts one example of abstraction model layers.

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and read and write set processing 96.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing in a computing environment, said computer program product comprising:
    at least one computer readable storage medium readable by at least one processing circuit and storing instructions for performing a method comprising:
        obtaining, from a transaction executing on a processor of the computing environment, a request to access a cache of the computing environment;
        determining, based on obtaining the request, whether a tracking set to be used to track cache accesses is to be updated, the tracking set comprising a read set to track read accesses of at least a selected portion of the cache and a write set to track write accesses of at least the selected portion of the cache, the tracking set being assigned to the transaction, wherein another transaction to access the cache has another tracking set assigned thereto, and wherein the determining whether the tracking set to be used to track cache accesses is to be updated comprises checking, using a definition selected from a plurality of definitions, whether the transaction is determined to be a younger transaction as compared to a selected other transaction of the computing environment, and wherein the updating is performed based on the transaction being determined, using the definition, to be the younger transaction; and
        updating the tracking set assigned to the transaction based on the determining indicating the tracking set assigned to the transaction is to be updated, wherein based on the request being a read request, the updating sets a read indicator of the read set to indicate the read is allowed to be processed, and based on the request being a write request, the updating sets a write indicator of the write set to indicate the write is allowed to be processed.

2. The computer program product of claim 1, wherein the one transaction is executing on one thread of the processor and the other transaction is executing on another thread.

3. The computer program product of claim 1, wherein the definition is selected from a group of definitions consisting of an application technique in which a programmer indicates which transaction is to be treated younger, an assignment of age to transactions, an indication that the younger transaction is a transaction started after the selected other transaction, and a flexible technique that defines age based on minimizing aborting of a chosen transaction.

4. The computer program product of claim 1, wherein the method further comprises aborting one or more chosen transactions based on the checking indicating the transaction is older than the selected other transaction.

5. The computer program product of claim 1, wherein the request to access the cache includes a read access, and the selected other transaction comprises a transaction determined to be a youngest transaction to perform a write to at least the selected portion of the cache as compared to other transactions writing to at least the selected portion of the cache.

6. The computer program product of claim 5, wherein the checking is performed based on determining that one or more write sets of at least the selected portion of the cache is marked by one or more different transactions than the transaction issuing the request.

7. The computer program product of claim 1, wherein the request to access the cache includes a write access, and the selected other transaction comprises a transaction determined to be a youngest transaction to access at least the selected portion of the cache as compared to other transactions accessing at least the selected portion of the cache.

8. The computer program product of claim 7, wherein the checking is performed based on determining that one or more tracking sets of at least the selected portion of the cache is marked by one or more different transactions than the transaction issuing the request.

9. The computer program product of claim 1, wherein the request includes a read access, and the determining whether the tracking set to be used to track cache accesses is to be updated comprises determining whether the read access is compatible with the one or more tracking sets of the one or more transactions, and wherein the updating is performed based on the read access being compatible, wherein the updating the tracking set includes updating the read set of the tracking set.

10. The computer program product of claim 1, wherein the request includes a write access, and the determining whether the tracking set to be used to track cache accesses is to be updated comprises determining whether the write access is compatible with the one or more tracking sets of the one or more transactions, and wherein the updating is performed based on the write access being compatible, wherein the updating the tracking set includes updating the write set of the tracking set.

11. A computer system for facilitating processing in a computing environment, said computer system comprising:
    a memory; and
    a processor in communication with the memory, wherein the computer system is configured to perform a method, said method comprising:
        obtaining, from a transaction executing on the processor, a request to access a cache of the computing environment;
        determining, based on obtaining the request, whether a tracking set to be used to track cache accesses is to be updated, the tracking set comprising a read set to track read accesses of at least a selected portion of the cache and a write set to track write accesses of at least the selected portion of the cache, the tracking set being assigned to the transaction, wherein another transaction to access the cache has another tracking set assigned thereto, and wherein the determining whether the tracking set to be used to track cache accesses is to be updated comprises checking, using a definition selected from a plurality of definitions, whether the transaction is determined to be a younger transaction as compared to a selected other transaction of the computing environment, and wherein the updating is performed based on the transaction being determined, using the definition, to be the younger transaction; and updating the tracking set assigned to the transaction based on the determining indicating the tracking set assigned to the transaction is to be updated, wherein based on the request being a read request, the updating sets a read indicator of the read set to indicate the read is allowed to be processed, and based on the request being a write request, the updating sets a write indicator of the write set to indicate the write is allowed to be processed.

12. The computer system of claim 11, wherein the definition is selected from a group of definitions consisting of an application technique in which a programmer indicates which transaction is to be treated younger, an assignment of age to transactions, an indication that the younger transaction is a transaction started after the selected other transaction, and a flexible technique that defines age based on minimizing aborting of a select transaction.

13. The computer system of claim 11, wherein the request includes a read access, and the determining whether the tracking set to be used to track cache accesses is to be updated comprises determining whether the read access is compatible with the one or more tracking sets of the one or more transactions, and wherein the updating is performed based on the read access being compatible, wherein the updating the tracking set includes updating the read set of the tracking set.

14. The computer system of claim 11, wherein the request includes a write access, and the determining whether the tracking set to be used to track cache accesses is to be updated comprises determining whether the write access is compatible with the one or more tracking sets of the one or more transactions, and wherein the updating is performed based on the write access being compatible, wherein the updating the tracking set includes updating the write set of the tracking set.

15. The computer system of claim 11, wherein the one transaction is executing on one thread of the processor and the other transaction is executing on another thread.

16. A computer-implemented method of facilitating processing in a computing environment, said computer-implemented method comprising:

obtaining, from a transaction executing on a processor of the computing environment, a request to access a cache of the computing environment;

determining, based on obtaining the request, whether a tracking set to be used to track cache accesses is to be updated, the tracking set comprising a read set to track read accesses of at least a selected portion of the cache and a write set to track write accesses of at least the selected portion of the cache, the tracking set being assigned to the transaction, wherein another transaction to access the cache has another tracking set assigned thereto, and wherein the determining whether the tracking set to be used to track cache accesses is to be updated comprises checking, using a definition selected from a plurality of definitions, whether the transaction is determined to be a younger transaction as compared to a selected other transaction of the computing environment, and wherein the updating is performed based on the transaction being determined, using the definition, to be the younger transaction; and updating the tracking set assigned to the transaction based on the determining indicating the tracking set assigned to the transaction is to be updated, wherein based on the request being a read request, the updating sets a read indicator of the read set to indicate the read is allowed to be processed, and based on the request being a write request, the updating sets a write indicator of the write set to indicate the write is allowed to be processed.

17. The computer-implemented method of claim 16, wherein the definition is selected from a group of definitions consisting of an application technique in which a programmer indicates which transaction is to be treated younger, an assignment of age to transactions, an indication that the younger transaction is a transaction started after the selected other transaction, and a flexible technique that defines age based on minimizing aborting of a chosen transaction.

18. The computer-implemented method of claim 16, wherein the request includes a read access, and the determining whether the tracking set to be used to track cache accesses is to be updated comprises determining whether the read access is compatible with the one or more tracking sets of the one or more transactions, and wherein the updating is performed based on the read access being compatible, wherein the updating the tracking set includes updating the read set of the tracking set.

19. The computer-implemented method of claim 16, wherein the request includes a write access, and the determining whether the tracking set to be used to track cache accesses is to be updated comprises determining whether the write access is compatible with the one or more tracking sets of the one or more transactions, and wherein the updating is performed based on the write access being compatible, wherein the updating the tracking set includes updating the write set of the tracking set.

20. The computer-implemented method of claim 16, wherein the one transaction is executing on one thread of the processor and the other transaction is executing on another thread.

* * * * *